US012725437B2

(12) United States Patent
Arifuku

(10) Patent No.: US 12,725,437 B2
(45) Date of Patent: Sep. 1, 2026

(54) IMAGE PROCESSING APPARATUS AND IMAGE PROCESSING METHOD

(71) Applicant: SHARP KABUSHIKI KAISHA, Sakai City (JP)

(72) Inventor: Naoya Arifuku, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 386 days.

(21) Appl. No.: 18/195,384

(22) Filed: May 10, 2023

(65) Prior Publication Data

US 2023/0386234 A1 Nov. 30, 2023

(30) Foreign Application Priority Data

May 31, 2022 (JP) ................................ 2022-088678

(51) Int. Cl.
*G06V 30/10* (2022.01)
*G06V 10/24* (2022.01)

(52) U.S. Cl.
CPC .............. *G06V 30/10* (2022.01); *G06V 10/24* (2022.01)

(58) Field of Classification Search
CPC ......................... G06V 30/00–43; G06V 10/24
See application file for complete search history.

(56) References Cited

U.S. PATENT DOCUMENTS 8,265,335 B2 9/2012 Hamada
9,607,058 B1 * 3/2017 Gupta .................. G06V 10/235
10,805,481 B2 10/2020 Narita et al.
2005/0123209 A1 * 6/2005 Kitora ...................... H04N 1/41 382/243
2007/0011747 A1 * 1/2007 Whitfield, Jr. ........ G06F 3/0604 348/E7.063
2010/0202691 A1 8/2010 Hamada
2011/0252484 A1 * 10/2011 Kobayashi ....... G11B 20/00086 726/32
2013/0339498 A1 * 12/2013 Johnson ................ H04L 67/104 709/221
2015/0169971 A1 * 6/2015 Cummins ............... G06F 40/00 382/182
2018/0183883 A1 * 6/2018 Hashikami ............ G06F 3/1239
2019/0253571 A1 8/2019 Narita et al.
2020/0097713 A1 * 3/2020 Cramer ................ G06V 30/413
2020/0344362 A1 * 10/2020 Miyamoto ........... G06V 30/414
(Continued)

FOREIGN PATENT DOCUMENTS

JP 2005-167937 A 6/2005
JP 2010183478 A 8/2010
JP 2019139619 A 8/2019

*Primary Examiner* — Sean T Motsinger
(74) *Attorney, Agent, or Firm* — ScienBiziP, P.C.

(57) ABSTRACT

Provided is a technology or the like including an acquirer that acquires an input image, a character recognizer that performs character recognition processing for recognizing a character included in the input image based on a first setting, an image processer that executes image processing on the input image based on a result of the character recognition processing, an outputter that outputs an output file using at least one of a result of the image processing and the result of the character recognition processing, and a controller that restricts, when a second setting is set, a use of the result of the character recognition processing in the outputter regardless of the first setting.

7 Claims, 19 Drawing Sheets

(56) References Cited

U.S. PATENT DOCUMENTS

| | | | | |
|---|---|---|---|---|
| 2021/0127035 | A1* | 4/2021 | Kim | G06F 3/1224 |
| 2022/0027652 | A1* | 1/2022 | Bhaskar | G06F 18/21 |
| 2022/0070323 | A1* | 3/2022 | Tokuda | H04N 1/00331 |
| 2023/0280954 | A1* | 9/2023 | Fujisaki | G06F 3/1255<br>358/1.14 |
| 2023/0386234 | A1* | 11/2023 | Arifuku | G06V 30/10 |
| 2023/0388424 | A1* | 11/2023 | Nishii | H04N 1/00801 |
| 2024/0153299 | A1* | 5/2024 | Pillai | G06V 30/41 |
| 2024/0177332 | A1* | 5/2024 | Mallick | G06V 30/414 |
| 2024/0403589 | A1* | 12/2024 | Irwin, Jr. | G06V 10/245 |

* cited by examiner

FIG. 5A

| SETTING ITEMS | SETTING VALUES |
|---|---|
| JOB MODE | e-mail scan |
| FORMAT | PDF |
| OCR | ON |
| RESOLUTION | 400 dpi |
| COMPRESSION RATIO | MEDIUM |
| ENCRYPTION | OFF |
| FILE BY PAGE | OFF |
| ⋮ | ⋮ |

FIG. 5B

| SETTING ITEMS | SETTING VALUES |
|---|---|
| ⋮ | ⋮ |
| PROHIBIT TRANSMISSION FROM PC-FAX | OFF |
| PROHIBIT MY ADDRESS SEARCH | OFF |
| PROHIBIT OCR | OFF |
| ⋮ | ⋮ |

IMAGE PROCESSING APPARATUS AND IMAGE PROCESSING METHOD

BACKGROUND OF THE INVENTION

Field of the Invention

The present disclosure relates to an image processing apparatus and the like.

Description of the Background Art

An image processing apparatus is known to have technology of restricting a user from executing a predetermined process from the viewpoint of security and the like.

For example, the technology is known in prior art that can appropriately set whether or not, before obtaining vector data from a paper document, the original paper document is converted into reusable vector data.

An object of the present disclosure is to provide technology capable of appropriately restricting, for example, a user from using a predetermined function.

SUMMARY OF THE INVENTION

An image processing apparatus of the present disclosure includes an acquirer that acquires an input image, a character recognizer that performs character recognition processing for recognizing a character included in the input image based on a first setting, an image processer that executes image processing on the input image based on a result of the character recognition processing, an outputter that outputs an output file using at least one of a result of the image processing and the result of the character recognition processing, and a controller that restricts, when a second setting is set, a use of the result of the character recognition processing in the outputter regardless of the first setting.

An image processing method of the present disclosure includes performing character recognition processing for recognizing a character included in an image based on a first setting, executing image processing on an input image based on a result of the character recognition processing, and outputting an output file using a result of the image processing regardless of the first setting when a second setting that restricts the character recognition processing is set, and outputting the output file using the result of the image processing and the result of the character recognition processing when the second setting that restricts the character recognition processing is not set.

According to the present disclosure, it is possible to provide the technology capable of appropriately restricting, for example, the user from using the predetermined function.

BRIEF DESCRIPTION OF THE DRAWINGS

FIG. 5A and FIG. 5B are diagrams for explaining (A) an example of a data configuration of a job setting table, and (B) an example of a data configuration of system settings in the first embodiment.

DESCRIPTION OF THE PREFERRED EMBODIMENTS

Hereinafter, embodiments for carrying out the present disclosure will be described with reference to the drawings. Hereinafter, embodiments for carrying out the present disclosure will be described with reference to the drawings. Note that the embodiments below are merely examples of the present disclosure, and the content of the present disclosure is not to be construed as being limited based on the following description.

A general image processing apparatus is known to have a function (e.g., an optical character recognition (OCR) function) of executing character recognition processing on an acquired document image and outputting a result of character recognition. In such an apparatus, ON/OFF of the OCR function can be optionally set by a user on a setting screen (e.g., a scan mode setting screen) at the time of job execution.

However, when the user uses the OCR function, for example, a file in which texts as a result of the character recognition are embedded is output. From this file, the user can easily extract text information by using a search function or a copy function. In order to prevent information leaks, there is a demand for prohibiting the OCR function in the image processing apparatus.

However, if the OCR function is prohibited, functions based on the OCR function (e.g., an orientation detection function, a file name automatic setting function, a business card scanning function, a translation function, etc.) also become unavailable, which may lead to a decrease in usability.

As described above, among the processes (functions) executed in the image processing apparatus, some processes are used by the user and also used as internal processes of the apparatus. By restricting the use of such specific processes (specific functions) used by both to the user while allowing them to be used as the internal processes of the apparatus, the following embodiments achieve, for example, ensuring security and maintaining the usability for the user.

In this manner, as an example of the image processing apparatus, a setting for permitting/prohibiting the OCR function is added on a system setting screen of a multifunction peripheral/printer/product (MFP), so that it becomes possible to prohibit the OCR function as the MFP system, and as a result, information leaks can be prevented.

Further, for example, even if the OCR function is prohibited as the MFP system, the functions based on the OCR function (an orientation detection function, a file name automatic setting function, a business card scanning function, a translation function, etc.) are made available with some of their functions restricted, making it possible to ensure the security and maintain the usability at the same time.

1. First Embodiment

1.1 Overall System

Figure 1:
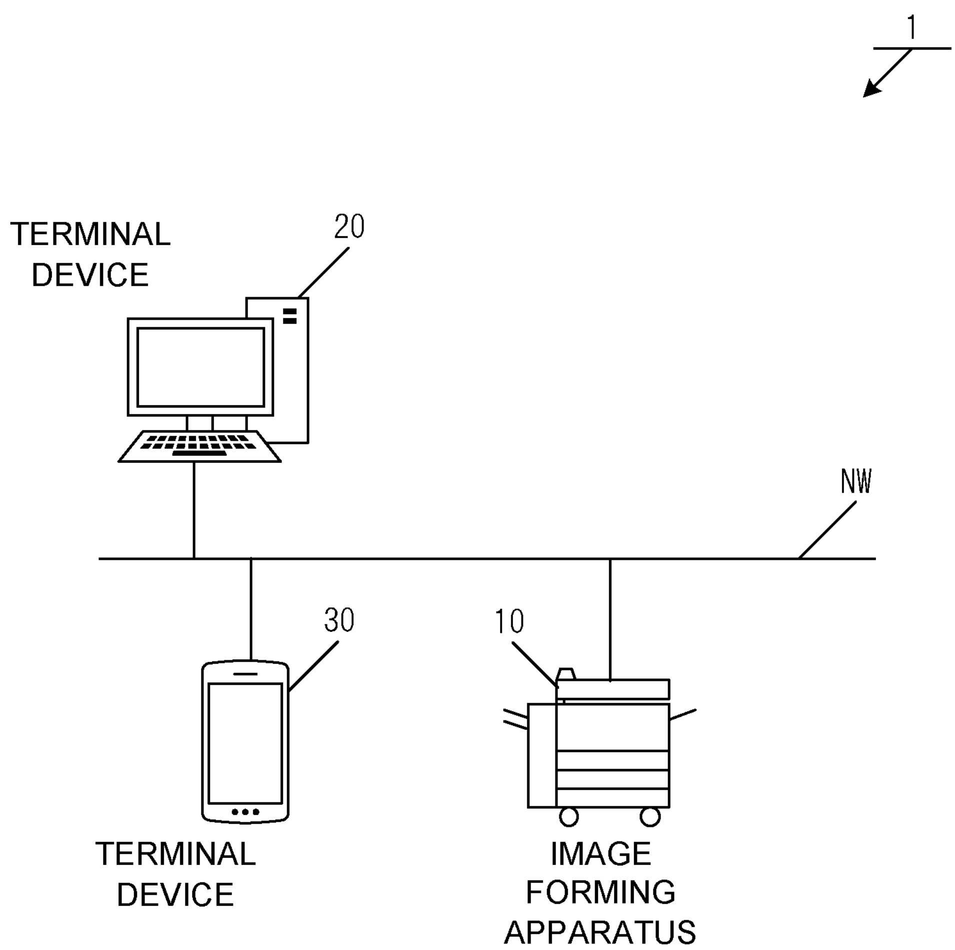
FIG. 1 is a diagram for explaining an outline of a system in a first embodiment.

FIG. 1 is a diagram for explaining an outline of a system 1. In the system 1, an image forming apparatus 10 as an example of an image processing apparatus is connected to network. Here, the image forming apparatus is an apparatus generally called a printer, an MFP, a copier, or a facsimile machine.

Further, a terminal device 20, a terminal device 30, and the like may be connected to network NW. The terminal device 20 is a device capable of submitting a job to the image forming apparatus 10, displaying a system setting screen, and the like. The terminal device 20 may be, for example, a device that is connected to the network NW (e.g., a device such as a computer, a tablet, or a smartphone). FIG. 1 show an example in which the terminal device 20 is a computer, and the terminal device 30 is a smartphone. Note that, in the present specification, the terminal device 20 will be described as an example.

Further, although the terminal device 20 (terminal device 30) is connected to the same network NW as the image forming apparatus 10 in the description, it may be connected to another network. For example, the terminal device 20 may be connected to the image forming apparatus 10 via the internet, which is an external network.

1.2 Hardware Configuration

Figure 2:
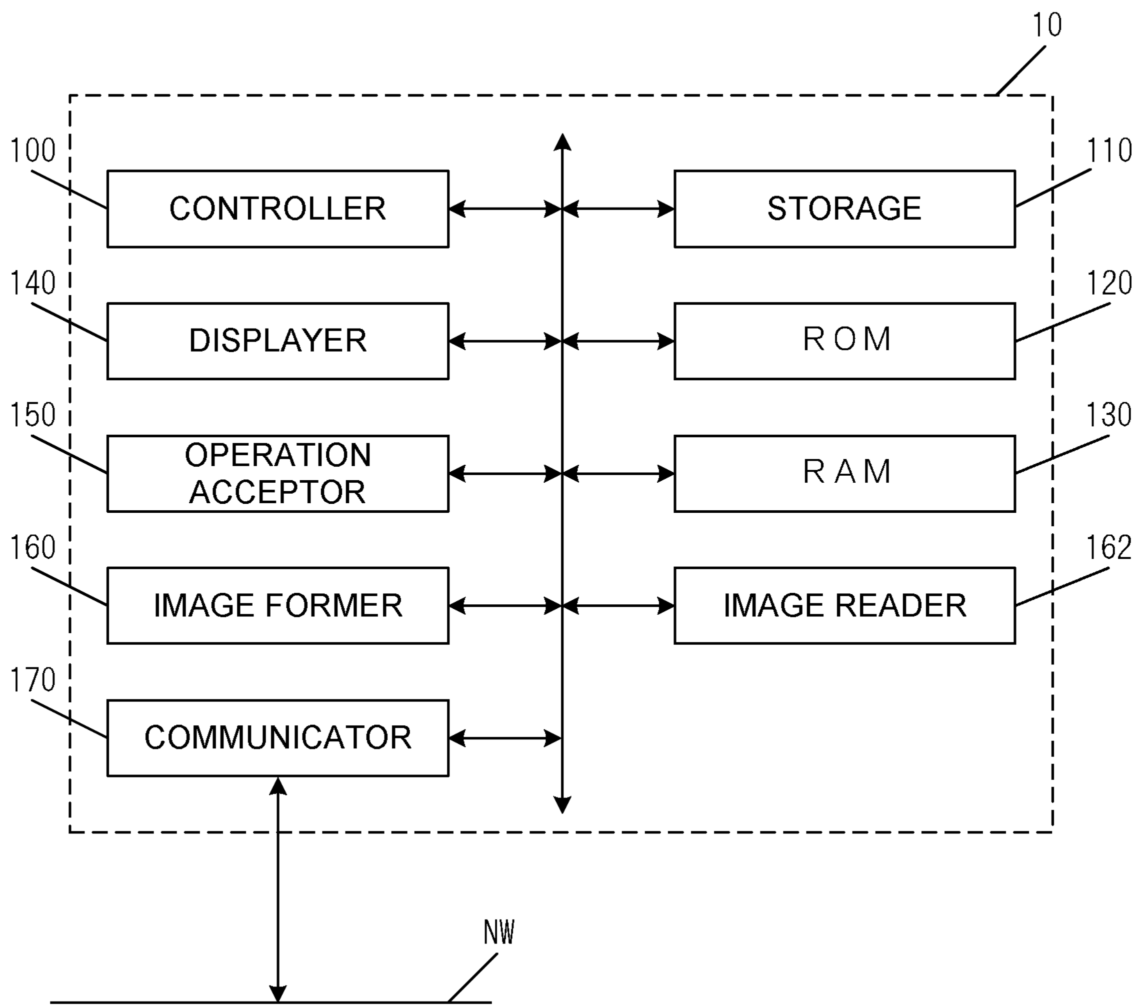
FIG. 2 is a diagram for explaining a hardware configuration of an image forming apparatus 10 in the first embodiment.
Figure 3:
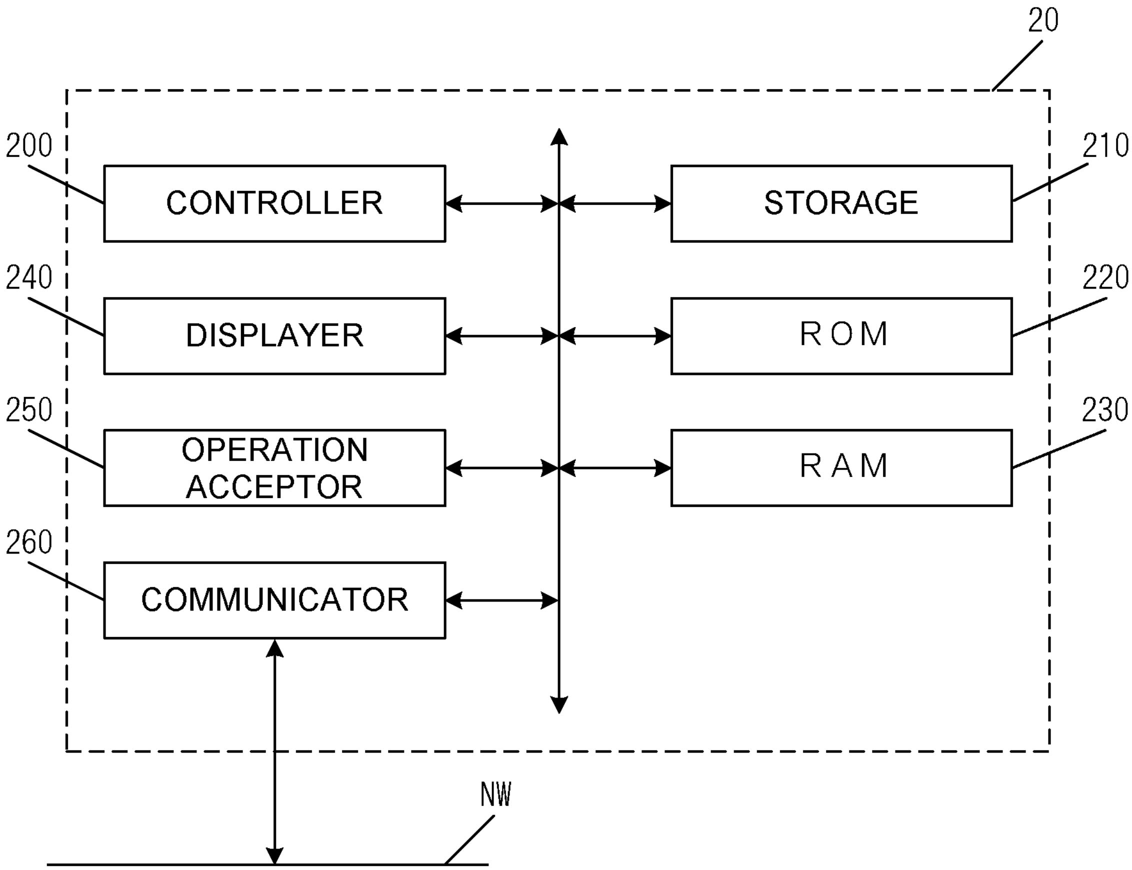
FIG. 3 is a diagram for explaining a hardware configuration of a terminal device 20 in the first embodiment.

A hardware configuration of each device will be described below with reference to the drawings. FIG. 2 shows an example of a hardware configuration of the image forming apparatus 10, and FIG. 3 shows an example of a hardware configuration of the terminal device 20.

1.2.1 Image Forming Apparatus

As shown in FIG. 2, the image forming apparatus 10 includes a controller 100, a storage 110 as a storage device, a Read Only Memory (ROM) 120 and a Random Access Memory (RAM) 130, a displayer 140, an operation acceptor 150, an image former 160, an image reader 162, and a communicator 170.

The controller 100 is a functional unit for controlling the image forming apparatus 10 as a whole. The controller 100 reads and executes various programs stored in the storage 110 and the ROM 120 for achieving various functions. The various functions may be achieved by one or more control devices/arithmetic devices (Central Processing Unit (CPU)), System on a Chip (SoC)).

The storage 110 is a non-volatile storage device capable of storing programs and data. For example, the storage 110 may be configured by a storage device such as a Hard Disk Drive (HDD) or a Solid State Drive (SSD). Further, the storage 110 may be configured by a Universal Serial Bus (USB) memory connectable to the outside. Further, the storage 110 may be, for example, a storage area on the cloud.

The ROM 120 is a non-volatile memory that can retain programs and data even when the power is turned off.

The RAM 130 is a main memory mainly used by the controller 100 at the time of executing processing. The RAM 130 is a rewritable memory that temporarily retains programs read from the storage 110 or ROM 120 and data including results at the time of execution.

The displayer 140 is a display device capable of displaying various pieces of information and execution screens. The displayer 140 may be, for example, a display device such as a liquid crystal display (LCD), an organic electro luminescence (EL) display, or an electrophoretic display. Further, the displayer 140 includes interface to which the display device can be connected. For example, the displayer 140 may be configured by an external display device connected via High-Definition Multimedia Interface (HDMI) (registered trademark), Digital Visual Interface (DVI), or Display Port.

The operation acceptor 150 is an operation device that allows a user to input an operation. For example, the operation acceptor 150 may be an operation device such as a touch panel integrated with the displayer 140 or an operation button. Further, the operation acceptor 150 may include interface to which an operation device can be connected. For example, the image forming apparatus 10 may be connected to a different operation device (an operation device with a touch panel).

The communicator 170 is communication interface that communicates with other devices. For example, the communicator 170 may be network interface capable of providing wired connection or wireless connection. In the present embodiment, the communicator 170 allows communication with other devices via the network NW.

The image former 160 forms an image, for example, on a recording paper. The image former 160, for example, includes an image carrier, forms a toner image on the image carrier, and transfers the image on the image carrier onto the recording paper, thereby forming an image. The image former 160 may be configured as an image forming device such as a printer. Further, the image former 160 may electronically form an image as an image file.

The image reader 162 reads a document (image) and outputs it as image data. The image reader 162 is, for example, a scanner, and may be a reading device using a Charge Coupled Device (CCD) or Contact Image Sensor (CIS).

1.2.2 Terminal Device

As shown in FIG. 3, the terminal device 20 includes a controller 200, a storage 210 as a storage device, a ROM 220 and a RAM 230, a displayer 240, an operation acceptor 250, and a communicator 260.

These configurations are basically the same as those of the image forming apparatus 10 described above. For example, the controller 200 is a functional unit for controlling the terminal device 20 as a whole. The controller 200 reads and executes various programs stored in the storage 210 and the ROM 220 for achieving various functions. The various functions may be achieved by one or more control devices/arithmetic devices (CPU, SoC).

The storage 210 is a non-volatile storage device capable of storing programs and data. For example, the storage 210 may be configured by a storage device such as HDD or SSD. Further, the storage 210 may be configured by a USB memory connectable to the outside, a compact disc (CD)-

ROM drive, or a Blu-ray disc (BD)-drive. Further, the storage 210 may be, for example, a storage area on the cloud.

1.3 Software Configuration

Figure 4:
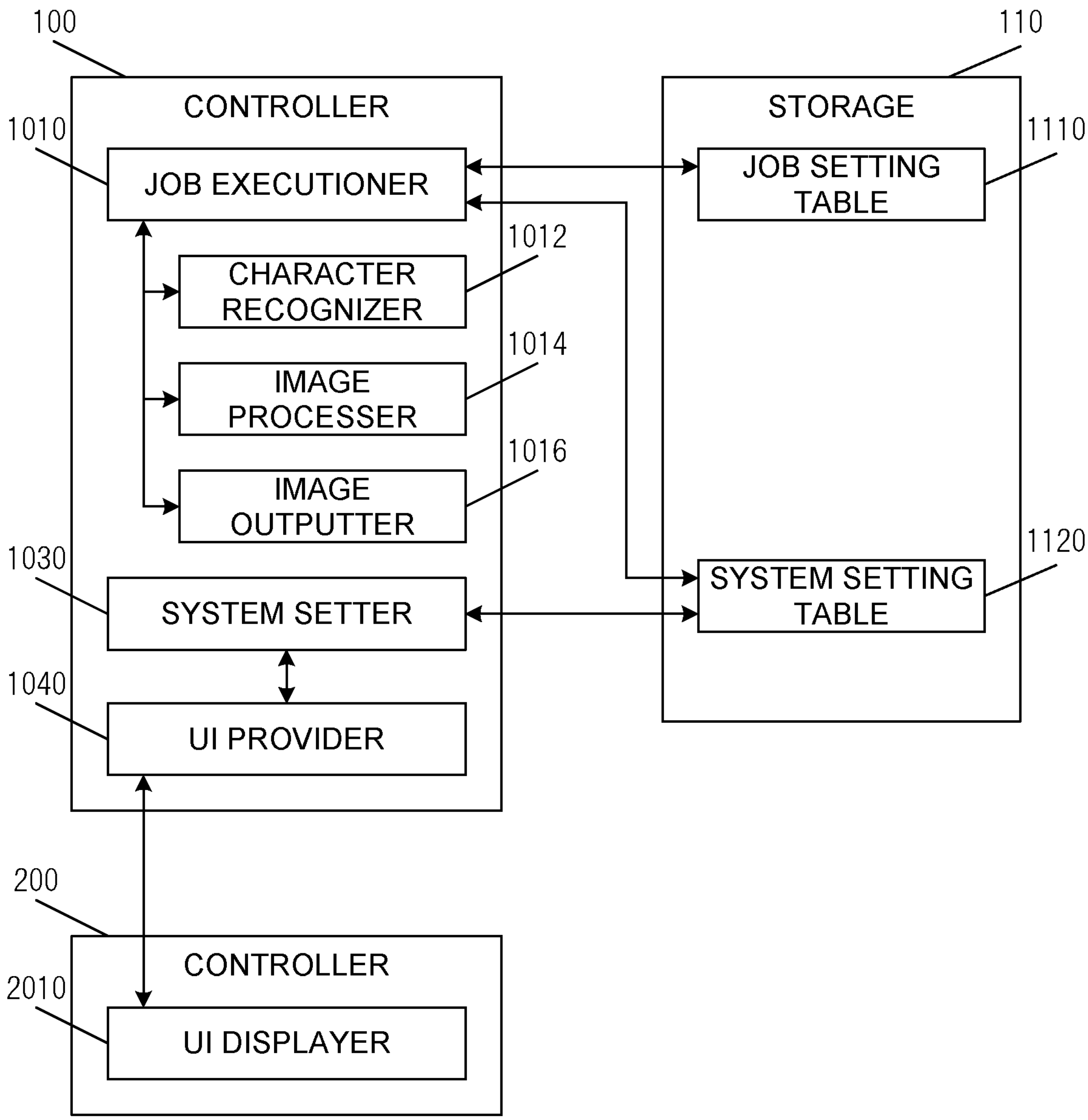
FIG. 4 a diagram for explaining a software configuration in the first embodiment.

A software configuration will be described with reference to FIG. 4. FIG. 4 is a diagram for explaining the software configuration of the image forming apparatus 10 and the terminal device 20.

The controller 100 of the image forming apparatus 10 executes programs (applications) stored in the storage 110 or the ROM 120 and functions as a job executioner 1010, a character recognizer 1012, an image processer 1014, an image outputter 1016, a system setter 1030, and a user interface provider (UI provider) 1040.

Further, the storage 110 of the image forming apparatus 10 stores a job setting table 1110 and a system setting table 1120.

The job executioner 1010 executes a job selected by the user. Examples of the job include a copy job that achieves a copy function, a print job that performs printing based on print data transmitted from the terminal device 20, a scan job that reads a document and outputs it as image data in a case where the image reader 162 is, for example, a scanner device, and a facsimile job that transmits and receives image data via facsimile communication. The job executioner 1010 executes character recognition processing, image processing, and file output processing depending on the job to be executed.

Further, the job executioner 1010 displays a screen for the user to execute the job. For example, the job executioner 1010 displays a job mode screen for the user to submit the job, a job setting screen for the user to make settings at the time of job execution, a job execution screen to be displayed when the user executes the job, and the like.

The character recognizer 1012 performs character recognition. For example, character data can be output by executing the character recognition processing on an image read by the image reader 162. The character recognizer 1012 may perform the character recognition, for example, by recognizing patterns of characters. The character recognition processing achieved by the character recognizer 1012 is called, for example, OCR processing, which includes layout analysis processing, line or character extraction processing, character pattern matching processing, and the like.

The image processer 1014 executes various types of processing on an image. The image processer 1014 can achieves various functions in addition to general image processing such as, for example, tone conversion processing for converting an image tone and sharpening processing for sharpening an image.

Further, the image processer 1014 may execute specific processing by using a result of processing executed by the character recognizer 1012 or character data output by the character recognizer 1012. For example, the image processer 1014 may execute processing of determining the orientation of an image (orientation determination processing) by using the orientation of characters determined by the character recognizer 1012 at the time of character recognition. Further, for example, the image processer 1014 may execute file name automatic setting processing that sets a file name based on the character data output by the character recognizer 1012.

Further, the image processer 1014 may achieve processing that extracts a specific pattern from an input image and outputs a plurality of images. For example, the image processer 1014 may achieve processing of detecting an image of a business card from the input image and outputting it as business card data (business card scanning processing). The image processer 1014 may recognize a company name, a name, a title, an address, a telephone number, and the like written on the business card from the character data output by the character recognizer 1012, and output them as destination information.

The image outputter 1016 outputs a predetermined image. For example, the character recognizer 1012 executes the character recognition processing on an image (input image) read by the image reader 162. The image outputter 1016 can output a combination of the image (input image) read by the image reader 162 and the character data as a result of recognition by the character recognizer 1012 as an image (output image).

Further, the image outputter 1016 can output an image as a file. For example, the image outputter 1016 can output an image as an image data file (image file) or as a document file. Further, the image outputter 1016 may temporarily output image data and then output the image to another device. For example, the image outputter 1016 can print an image on a recording paper by outputting the image to the image former 160. Further, the image outputter 1016 may output the image to the image former 160 or another device via facsimile communication using the communicator 170.

Further, the image outputter 1016 can output the image processed by the image processer 1014 as a file with a predetermined format. The image outputter 1016 can output files with various formats such as, for example, a Portable Document Format (PDF) file, a text file (e.g., a DOC format file, a DOCX format file, an ODT format file, etc.), a spreadsheet file (e.g., a XLS format file, a XLSX format file, an ODS format file, etc.), and an image file (e.g., a TIFF format, a JPEG format, etc.). In this manner, the image outputter 1016 functions as an output unit (file output unit).

The system setter 1030 performs system settings as the entire system settings of the image forming apparatus 10. The system settings described herein are settings which are commonly used when the image forming apparatus 10 is operated and are settings which are also used when a job is executed. The system setter 1030 is generally set or updated by a specific user (e.g., an administrator user). The system setter 1030 stores the system settings as the system setting table 1120 in the storage 110, which is a storage area.

Further, the system setter 1030 can change the system settings using the external terminal device 20 via the UI provider 1040. For example, the UI provider 1040 provides WEB interface to the connected terminal device 20, thereby enabling the terminal device 20 to change the system settings.

For example, when the controller 200 of the terminal device 20 executes a UI displayer 2010, the UI provided by the UI provider 1040 is displayed. For example, the UI displayer 2010 is achieved by a WEB browser in the terminal device 20. Further, the UI displayer 2010 may be a dedicated application executed in the terminal device 20.

The UI displayer 2010 can access the system setter 1030 via the UI provider 1040. Then, the user can change the system settings of the image forming apparatus 10 via the terminal device 20 by changing the system settings displayed in the UI displayer 2010.

Note that, in the following embodiment, the system setting screen is displayed in the image forming apparatus 10 as an example. However, the system setting screen may be displayed in an external device such as the terminal device 20 as described above.

The job setting table 1110 stores job settings. The job settings include setting values which the job executioner 1010 refers to when executing the job. The user can change the setting values before executing the job. FIG. 5A is a diagram showing an example of the job setting table 1110.

For example, the job setting table 1110 can store a job mode (e.g., "e-mail scan"), a file format (e.g., "PDF") that is output when a job is executed, a setting of whether to execute the character recognition processing (whether to use the OCR function) (e.g., "ON"), a resolution for scanning an image (or a resolution of output file) (e.g., "400 dpi"), a compression ratio of output file (e.g., "Medium"), a setting of whether to encrypt an output file (e.g., "OFF"), a method of outputting a file (e.g., outputting file by page is "OFF"), and the like.

The job executioner 1010 executes a job by referring to the job settings stored in the job setting table 1110 at the time of job execution.

The system setting table 1120 stores shared system settings in the image forming apparatus 10. FIG. 5B is a diagram showing an example of the system setting table 1120.

For example, the system setting table 1120 stores a setting value (e.g., "OFF") for "Prohibit transmission from PC-Fax" as a setting item. Further, the system setting table 1120 can store shared settings among the users. For example, the system setting table 1120 stores a setting indicating whether or not the user can use the OCR function when executing the job (e.g., "OFF" for "Prohibit OCR").

Here, the setting as to whether or not the user can use the OCR function in the image forming apparatus 10 is stored in the system settings (system setting table 1120) and the job settings (job setting table 1110). Regarding the use of the OCR function, in principle, the setting value set in the system settings has priority over the setting value set in the job settings. Thus, when the OCR function is invalid ("ON" for Prohibit OCR) in the system settings, it is preferable that the OCR function cannot be enabled in the job settings.

Note that the phrase "OCR function is invalid" in the present embodiment means that the user cannot freely use a result of the character recognition processing on the document. Thus, this does not include prohibiting the image forming apparatus 10 (controller 100) from executing the character recognition processing. Generally, when the user uses the OCR function, the image forming apparatus 10 outputs character data of the document (image), for example, in a form usable by the user. In the present embodiment, if the OCR function is invalid, the character data is prevented from being output.

Further, the phrase "OCR function is invalid" may include a case where the character data are output on a limited basis. For example, when the OCR function is invalid, the controller 100 embeds the character data in a file and outputs the file, but the character data may be restricted from being copied or edited.

1.4 Screen Transition

A screen transition in the present embodiment will be described with reference to FIG. 6. The image forming apparatus 10 can switch screens between, for example, a home screen (D10), a system setting screen (D12), a job mode screen (D14), a job setting screen (D16), and a job execution screen (D18).

First, the image forming apparatus 10 displays the home screen (D10). The home screen (D10) is, for example, a screen displayed in a menu mode (home mode). The user can switch the home screen to each mode by selecting an item displayed on the home screen or by submitting a job.

When the user selects the system settings from the home screen (D10), the image forming apparatus 10 makes a shift from the menu mode to a system setting mode. When the system setting mode is entered, the system setter 1030 displays the system setting screen (D12). The system setting screen (D12) is a screen on which the system settings, which are shared settings for the operation of the image forming apparatus 10, can be changed, and the functions of the image forming apparatus are set. The system setting screen may be displayed in the image forming apparatus 10 or may be displayed in the external terminal device 20 that has accessed the image forming apparatus 10. The system setting mode is, for example, a mode executed by an administrator. Thus, the system setting screen (D12) is displayed by, for example, the administrator.

After the setting values of the system settings are changed or registered by the administrator on the system setting screen (D12), the image forming apparatus 10 makes a shift to the home mode and displays the home screen (D10).

When the user selects the job mode on the home screen (D10), the image forming apparatus 10 executes the selected job mode. When the job mode is executed, the controller 100 (job executer 1010) displays the job mode screen (D14) corresponding to the executed job. Examples of the job mode screen for executing the job mode includes a copy screen for executing a copy job, a scan screen for executing a scan job, and a FAX screen for executing a FAX communication job.

The user selects the job settings to change the settings in the job mode. When the user selects the job settings, the image forming apparatus 10 displays the job setting screen (D16). The user can change the settings of the job to be executed on the job setting screen. Further, the user can select a function to be used in the job. For example, the user can select using the OCR function.

After the user performs the job settings on the job setting screen, the image forming apparatus 10 shifts the screen to the job mode screen (D14). Then, when the user instructs execution of the job, the image forming apparatus 10 displays the job execution screen (D18) and executes the job. After completing the execution of the job, the image forming apparatus 10 shifts the screen to the job mode screen (D14) again. Further, after the job mode is completed, the image forming apparatus 10 makes a shift to the home mode and displays the home screen (D10).

Note that the setting items for the job settings may be displayed not only on the job setting screen (D16) but also on the job mode screen (D14). For example, frequently used setting items (e.g., selection of file output format, resolution for reading document, etc.) may be displayed on the job mode screen. Further, frequently used setting values may be displayed on the job mode screen while less frequently used setting values may be displayed on the job setting screen.

As described above, the image forming apparatus 10 in the present embodiment has two setting screens as a setting screen. That is, the image forming apparatus 10 has the job setting screen mainly used by the user as a first setting screen and the system setting screen mainly used by the system administrator as a second setting screen.

Figure 6:
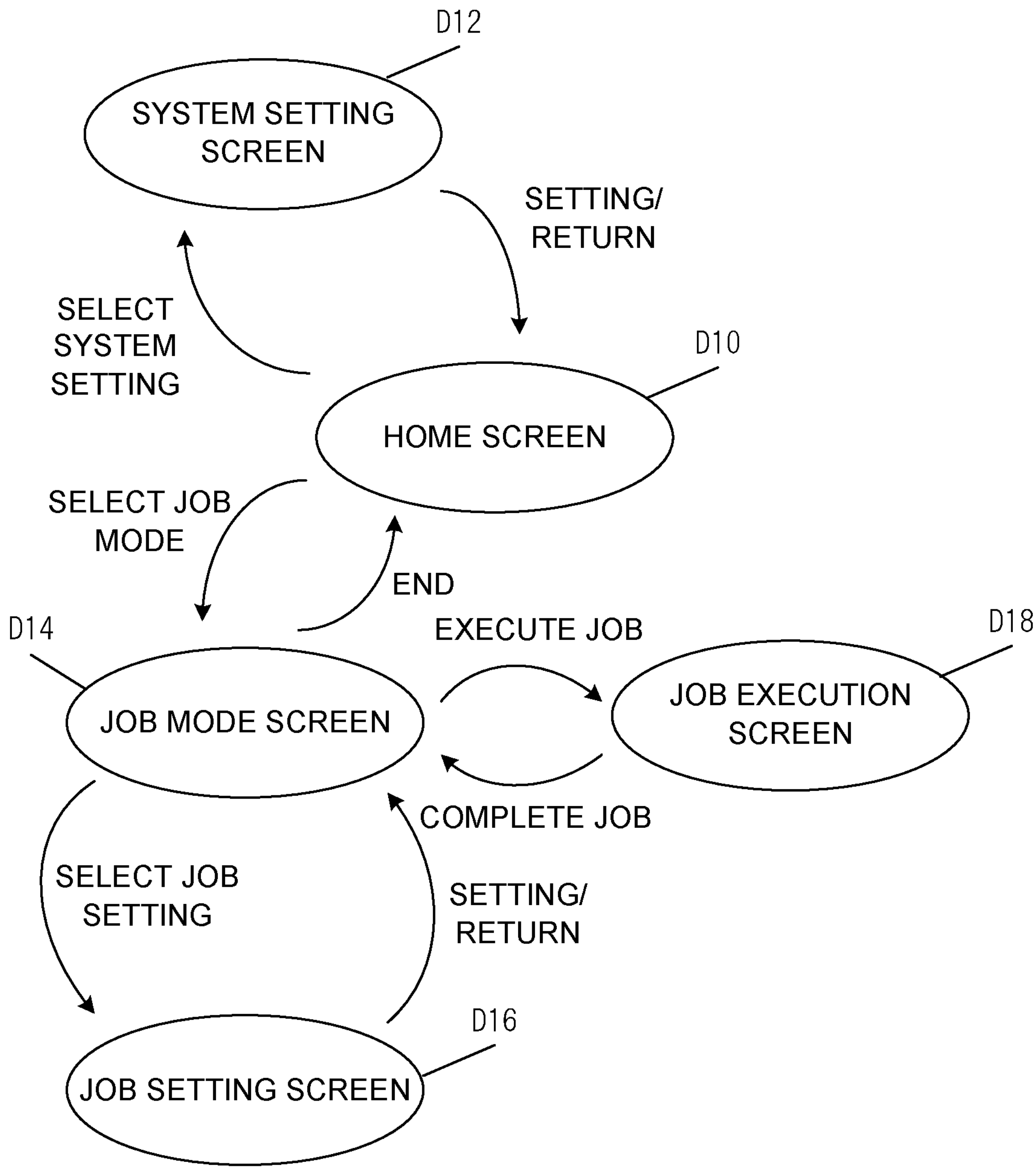
FIG. 6 is a diagram for schematically explaining screen transitions in the first embodiment.

Note that each screen shown in FIG. 6 may be displayed in the image forming apparatus 10 or may be displayed in another device. For example, the terminal device 20 or the terminal device 30 may display each screen via a WEB browser. Further, the terminal device 20 or the terminal device 30 may execute an application such as an operation application or a setting application and display each screen using the application.

1.5 Processing Flow 1.5.1 Main Processing

Next, a flow of main processing in the present embodiment will be described with reference to FIG. 7. The controller 100 displays the home screen in the image forming apparatus 10 (step S10). Subsequently, the controller 100 allows the user to select processing (step S12) In this step, when job execution is selected by the user (step S12; job execution), the job executioner 1010 starts executing the job.

The job executioner 1010 displays the job execution screen (step S14). Then, the job executioner 1010 executes the job setting processing as necessary (step S16). Then, after the user performs the job settings, the job executioner 1010 executes the job based on the job settings (step S18). Note that the controller 100 does not need to execute the job setting processing without the user's operation of performing the job settings.

Further, when the "System settings" is selected on the home screen (step S12; system settings), the controller 100 switches the operation mode to the system setting mode. In the system setting mode, the system setter 1030 displays the system setting screen on the displayer 140 (step S20). The system setter 1030 changes the setting values of the system settings which have been changed by the user (step S30). Note that the system setting screen may be displayed in an external device such as the terminal device 20 via the UI provider 1040.

Figure 7:
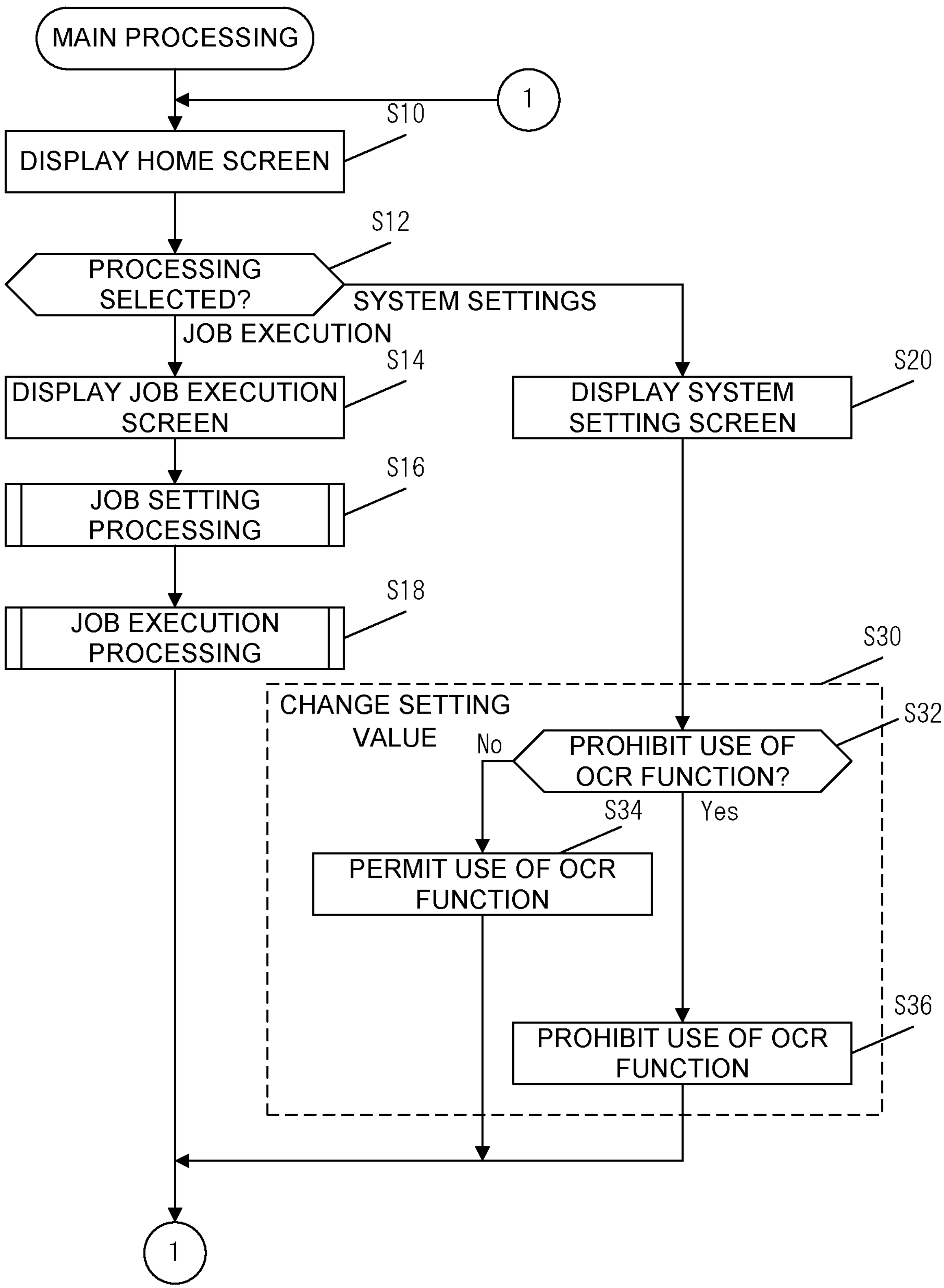
FIG. 7 is a flow diagram for explaining processing (main processing) in the first embodiment.

In FIG. 7, the use of the OCR function among the setting items of the system settings will be focused and described. The controller 100 determines whether or not the use of the OCR function is prohibited in the system settings (step S32).

When the use of the OCR function is set to be prohibited, the controller 100 (system setter 1030) sets the use of the OCR function to be prohibited (step S32; Yes to step S36). Further, when the use of the OCR function is set to be permitted, the controller 100 (system setter 1030) permits the use of the OCR function (step S32; No to step S34).

As described above, the controller 100 executing the processing in FIG. 7 can perform the settings in the job mode also in the system setting mode.

1.5.2 Job Setting Processing

Figure 8:
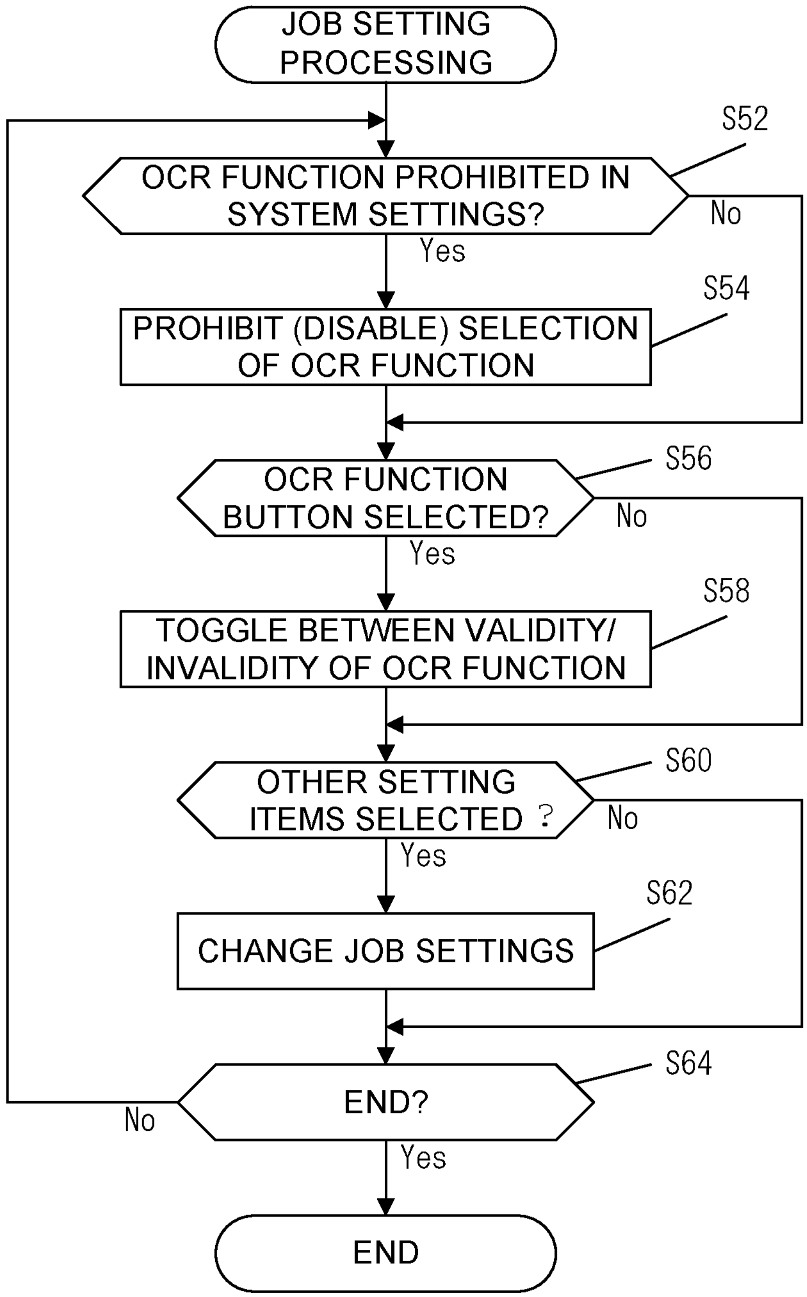
FIG. 8 is a flow diagram for explaining processing (job setting processing) in the first embodiment.

FIG. 8 is a flow diagram for explaining a flow of the job setting processing executed by the controller 100. The job setting processing is a process executed in the step S16 in FIG. 7 and is executed in the job mode.

When the use of the OCR function is prohibited in the system settings (e.g., "ON" for "Prohibit OCR"), the controller 100 prohibits (disables) the selection of the OCR function (step S52; Yes to step S54).

Prohibiting the selection of the OCR function means that, for example, when an operation button for enabling the OCR function is displayed on the displayer 140, the controller 100 displays the operation button in an unselectable manner. The phrase, "displaying the operation button in an unselectable manner", means, for example, that the controller 100 may display a grayed-out operation button not to be selected, or may hide the operation button not to be selected. Further, the controller 100 may display an error such as "unable to select" when the operation button is selected.

Subsequently, when the operation button for enabling the OCR function is selected by the user (step S56; Yes), the controller 100 toggles between validity and invalidity of the OCR function (step S58). That is, when the OCR function is "OFF" (invalid), the controller 100 can switch the OCR function to "ON" (valid) when the operation button is selected by the user. Further, when the OCR function is already "ON" (valid), the controller 100 can switch the OCR function to "OFF" (invalid) when the operation button is selected by the user. In this manner, for example, the operation button indicating the OCR function is a toggle button, making it easy to toggle between validity and invalidity of the OCR function. Note that, for example, the operation button may be other selection methods such as a check box, a radio button, and a pull-down menu instead of the button display.

Note that, when the OCR function is "invalid" in the system settings, the controller 100 prohibits (disables) the selection of the OCR function in the step S54. When the OCR function is invalid, the user cannot select the operation button for using the OCR function.

Subsequently, when another setting item is selected by the user, the controller 100 changes the job settings according to the selected item (step S60; Yes to step S62).

In this manner, in the job setting processing, settings in which the controller 100 (job executioner 1010) executes the job can be made according to the user's selection.

1.5.3 Job Execution Processing

The job execution processing will be described with reference to FIG. 9. The job execution processing is a process executed by the controller 100 (job executioner 1010).

First, the controller 100 (job executioner 1010) executes document acquisition processing (step S102). Having executed the document acquisition processing, the controller 100, for example, reads the document by the image reader 162 and acquires it as an image. Further, the controller 100 may acquire an image from, for example, another device or an external memory (e.g., a USB memory, etc.) via the communicator 170.

Subsequently, the controller 100 determines whether or not the use of the OCR function is "prohibited" (step S104). If the use of the OCR function is not "prohibited" (step S104; No), the controller 100 executes the character recognition processing (step S120). Specifically, the character recognizer 1012 performs the character recognition processing on the image acquired in the step S102 and outputs character data based on the recognized characters.

The controller 100 (image processer 1014) executes the set image processing (step S122). For example, in this figure, if the orientation determination is valid, the image processer 1014 determines the orientation of the document based on the result of the character recognition processing Then, the controller 100 determines an inclination of the orientation of the document as necessary and rotates the document by a determined angle. As a result, the controller 100 outputs an image in which the orientation of the document is corrected (output image obtained by correcting the orientation of the input image) or an image in which the inclination is corrected (output image obtained by correcting the inclination of the input image).

Then, the image outputter 1016 outputs a file including the character data output by the character recognition processing (step S124). For example, the image outputter 1016 outputs an image and a file in which the character data are embedded (e.g., a document file, a PDF file). That is, the controller 100 (image outputter 1016) embeds the recognized characters in the output file.

As described above, when the use of the OCR function is not prohibited, the controller 100 outputs a file including the output image and the character data. Note that the controller 100 (image outputter 1016) may output a file based on the character data different from the image. The file output by the controller 100 (image outputter 1016) may be, for example, a document file (e.g., a DOCX file, a XLSX file, a PPTX file, etc.) that can be used in word processing software or spreadsheet software. Further, the file to be output may be a file that can be displayed, while maintaining the layout, in another terminal device (e.g., a PDF file). Further, the image outputter 1016 may output a combination of a file based on the output image (image file) and a file based on the character data (a text file, a HTML file, etc.).

Returning to the step S104, when the use of the OCR function is "prohibited", the controller 100 executes the character recognition processing only in the image processing. That is, when the use of the OCR function is prohibited, the user cannot use the result obtained by executing the character recognition processing. From the user's point of view, the lack of output of the character data means that the OCR function is not available.

For example, when the controller 100 (image processer 1014) executes the image processing which uses a result of the character recognition, the controller 100 (image processer 1014) executes the character recognition processing. For example, in FIG. 9, the controller 100 (image processer 1014) executes, when the orientation determination function is valid (step S106; Yes), the character recognition processing (step S108).

That is, the controller 100 (character recognizer 1012) recognizes characters included in the image and outputs information on the recognized characters. The information on the recognized characters includes, for example, the orientation of the characters. The controller 100 (image processer 1014) determines the orientation of the document from the orientation of the characters determined by the character recognition processing and executes a process for correcting the orientation of the document to the right direction (step S110).

Then, since the use of the OCR function is prohibited, the controller 100 (image outputter 1016) outputs a file that includes the output image but does not include the character data (step S112).

Then, the controller 100 executes file transmission processing (step S114). The file transmission processing transmits the file output in the step S112 or the step S124 to another device or outputs it to a recording medium. Further, in the file transmission processing, the controller 100 may attach the file to an email and send it or transmit the file to an area on the cloud. Further, the controller 100 may post the file to a social networking service (SNS).

1.6 Operation Example

Figure 10:
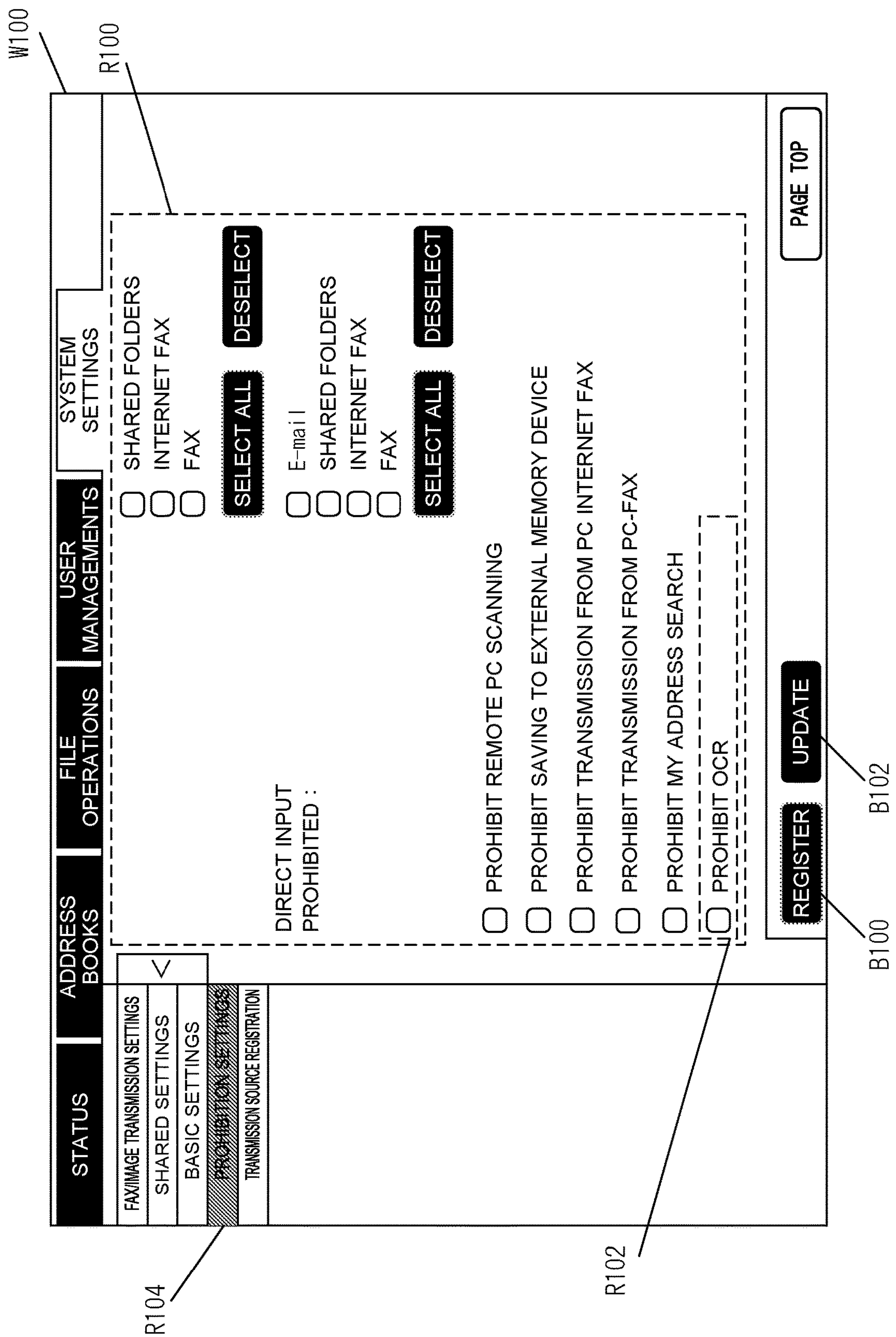
FIG. 10 is a diagram illustrating an example of a display screen (system setting screen) in the first embodiment.

An operation example will be described using an example of a display screen. FIG. 10 is a diagram showing a display screen W100, representing an example of the system setting screen. The display screen W100 displays setting items in an area R100. The setting items displayed here are, for example, setting items corresponding to a group selected in a group area R104.

The area R100 displays one or more setting items. For example, as an example, it is possible to set "Prohibit OCR" in the setting item R102. If "Prohibit OCR" is set to "ON" here, the user is prevented from using the OCR function.

The items set in the area R100 are newly stored in the system setting table 1120 when a registration button B100 is selected. Further, for the items set in the area R100, the contents stored in the system setting table 1120 are updated by selecting an update button B102.

Figure 11:
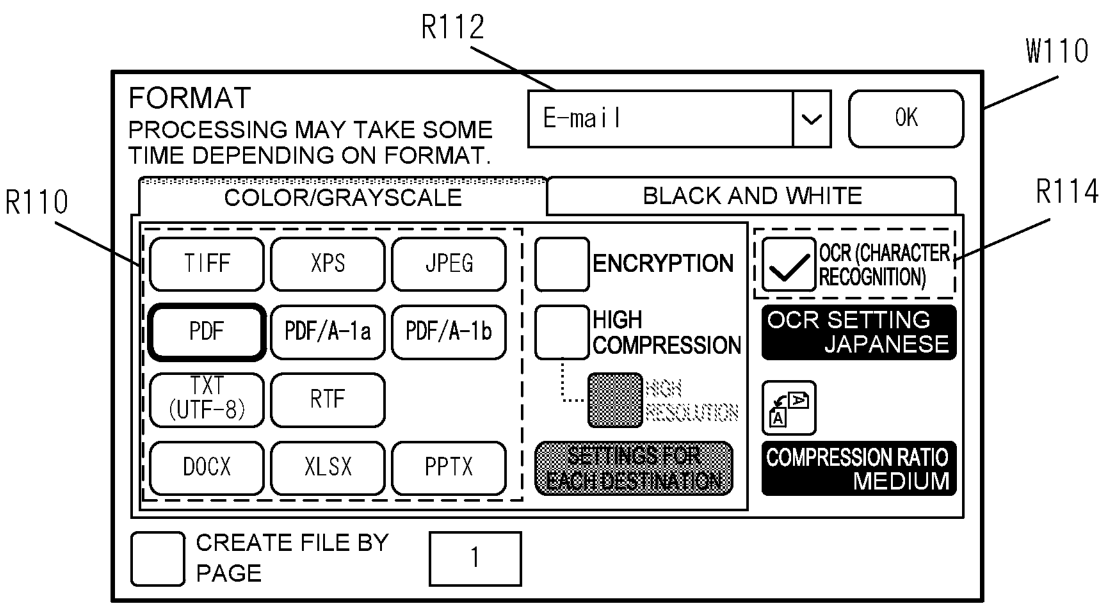
FIG. 11 is a diagram illustrating an example of a display screen (job setting screen) in the first embodiment.

FIG. 11 is a diagram showing a display screen W110, representing an example of the job setting screen. In the display screen W110, a file format of the file to be output can be selected in an area R110. For example, the user can select an output format such as "TIFF", "XPS", or "JPEG" for an image file, "PDF", "Text", or "RTF" for a document file, or "DOCX", "XLSX", or "PPTX" for other files.

Further, the user may select a PDF file from multiple types of PDF files. For example, the user may be able to select a format such as "PDF/A-1a", "PDF/A-1b", "PDF/A-2", or "PDF/X" as a type of PDF file.

Further, the controller 100 may be able to perform "encryption" according to the file and may be able to set a compression ratio. Further, the controller 100 may put a password on the file.

An area R112 may allow selection of a file transmission method for the output file. For example, "E-mail" is selected in the area R112 of the display screen W110. The controller 100 (image outputter 1016) attaches the output file to an E-mail and sends the E-mail to a designated destination. The destination of the E-mail may be selected in advance or may be selected after the job execution (e.g., after selecting the start button).

Further, an area R114 displays a button (checkbox) for selecting whether to use the OCR function. For example, when the user turns the OCR function "ON" in the area R114, the controller 100 outputs a file including character data (e.g., a PDF file in which the character data are embedded).

Further, when the use of the OCR function is set to be prohibited in the system settings, the user is prevented from selecting the OCR function operation button in the area R114.

1.7 Advantageous Effects

As described above, according to the present embodiment, whether or not to permit the use of the OCR function can be set both on the system setting screen and the job setting screen. Further, prohibiting the OCR function on the system setting screen can restrict the user from using the OCR function. That is, the administrator can uniformly prohibit the user from using the OCR function on the system setting screen in order to ensure security.

Further, in the present embodiment, the use of the OCR function and the execution of the character recognition processing by the image forming apparatus 10 are separately managed. As a result, although the user is prevented from using the OCR function, the image forming apparatus 10 can execute the character recognition processing, which is not very relevant for security purposes. That is, having executed the character recognition processing, the image forming apparatus 10 can use the character data obtained by the character recognition or the result of the character recognition processing in other processes. In this manner, the image forming apparatus 10 can ensure the security of files and image data to be created while maintaining the usability of the apparatus.

2. Second Embodiment

A second embodiment will be described. The second embodiment sets a function that is available to the image forming apparatus 10 when the user is prohibited from using the OCR function on the system setting screen. Note that only points that are different from the first embodiment are described in the present embodiment, and descriptions are omitted for points that are the same in functional configuration and processing.

Figure 12:
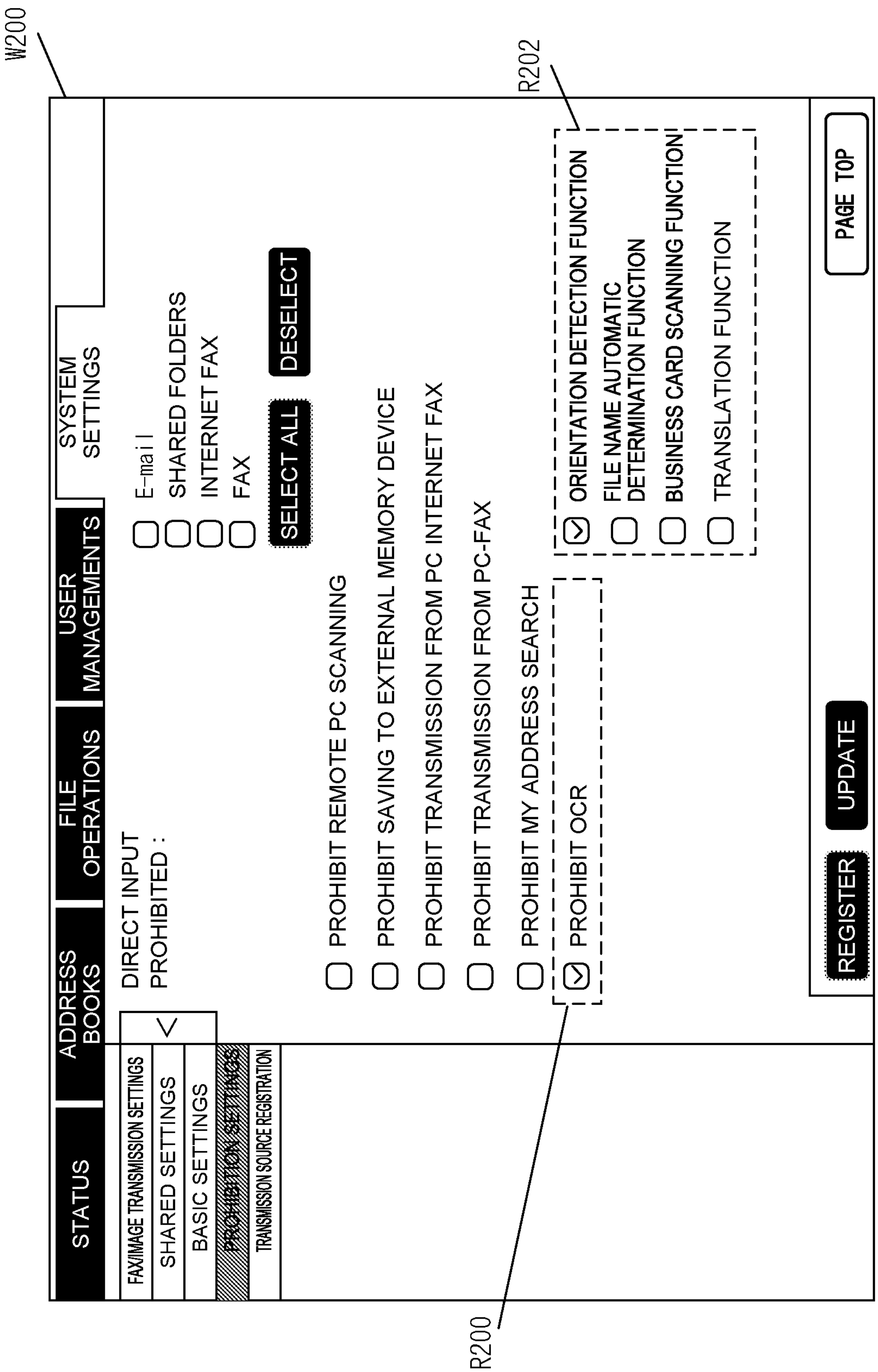
FIG. 12 is a diagram illustrating an example of a display screen (system setting screen) in a second embodiment.

FIG. 12 is a diagram showing an example of a system setting screen in the second embodiment. In a display screen W200 in FIG. 12, whether or not to permit the use of the OCR function can be selected in an area R200.

Further, when the use of the OCR function is prohibited in the area R200, whether or not to perform processes executed by the image processer 1014 can be selected in an area R202 on the system setting screen.

For example, in the area R202, "orientation determination function", "file name automatic determination function", "business card scanning function", and "translation function" can be set as the processes executed by the controller 100 (e.g., the image processer 1014).

For example, when the "orientation determination function" is "ON", the image processer 1014 executes the orientation determination processing by using the result of the character recognition processing. In this case, the user cannot output a file including the character data obtained by the character recognition. However, the user can use the orientation determination function obtained by using the result of the character recognition processing in the image processing.

As described above, according to the present embodiment, even when the use of the OCR function is restricted, the controller 100 (image processer 1014) can execute the processes obtained by using the result of the character recognition processing without restriction. Further, according to the present embodiment, the controller 100 can select executable processes from multiple processes.

3. Third Embodiment

A third embodiment will be described. In the third embodiment, when the use of the OCR function is "prohibited" on the system setting screen, the image outputter 1016, when outputting a file, adds an attribute that prohibits editing or copying of characters (editing prohibition attribute, copying prohibition attribute) to a file and outputs the attributed file. Note that only points that are different from the first embodiment are described in the present embodiment, and descriptions are omitted for points that are the same in functional configuration and processing.

Figure 9:
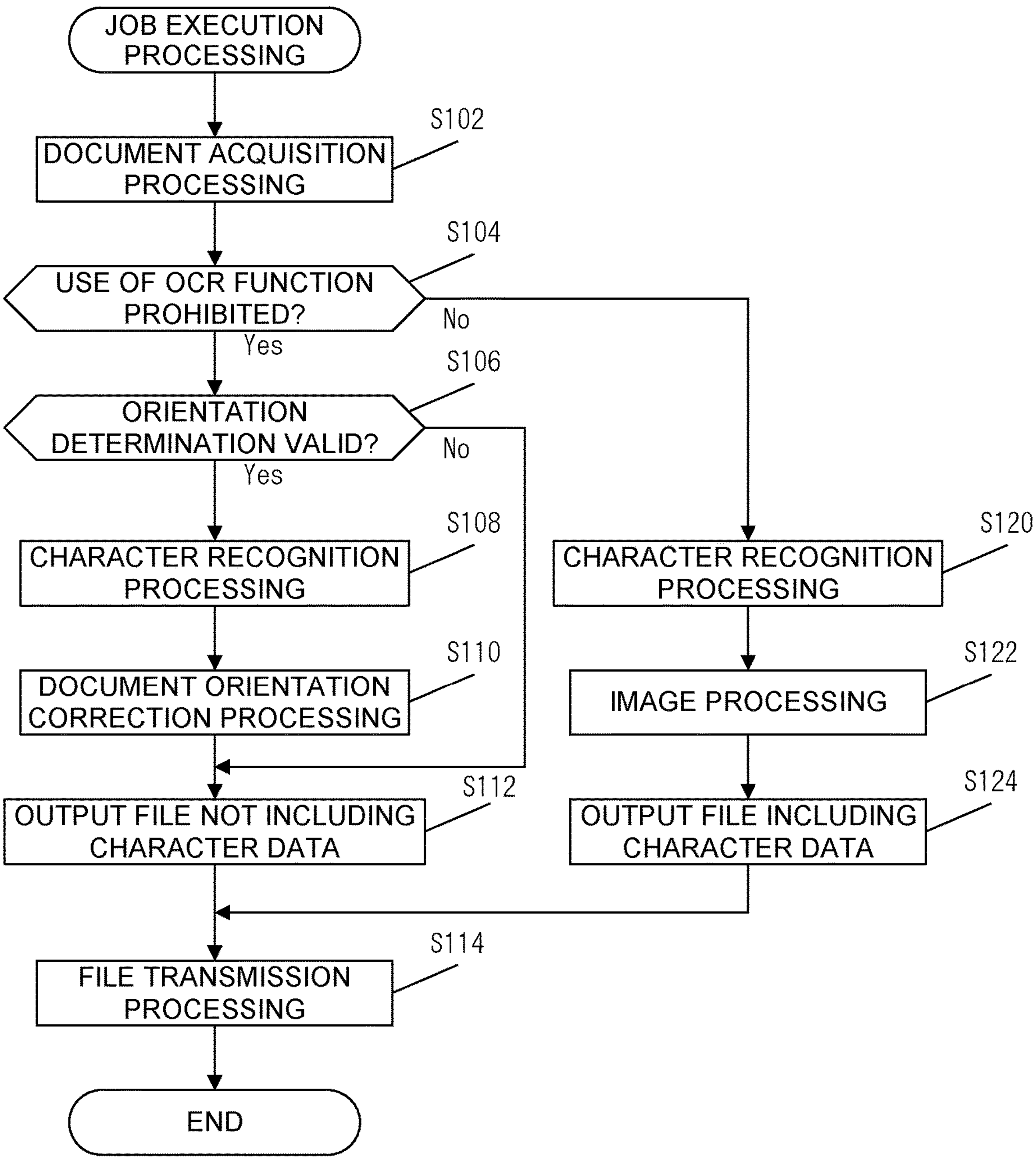
FIG. 9 is a flow diagram for explaining processing (job execution processing) in the first embodiment.
Figure 13:
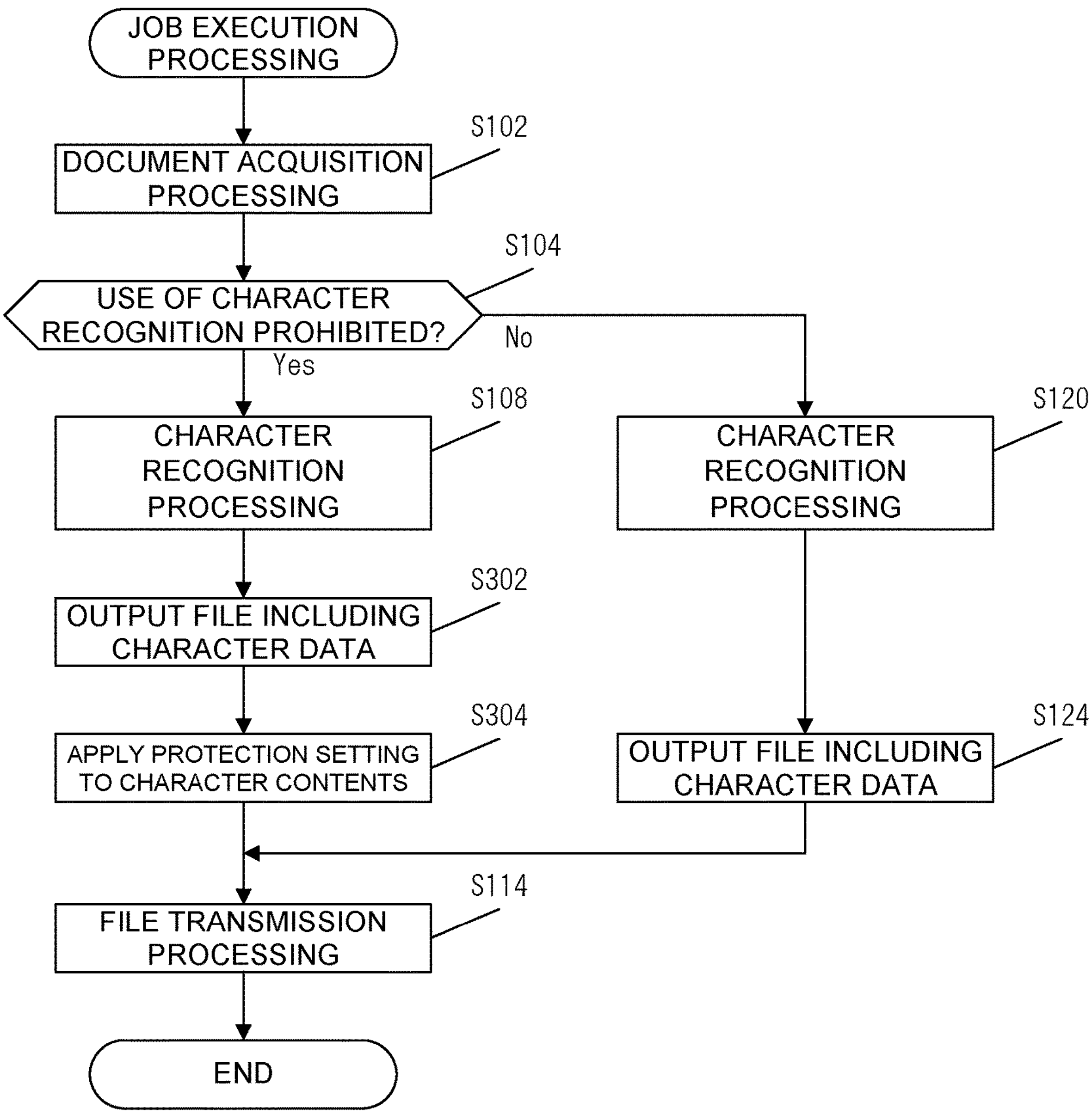
FIG. 13 is a flow diagram for explaining processing (job execution processing) in a third embodiment.

FIG. 13 is a flowchart modified from FIG. 9 of the first embodiment. The same reference signs are assigned to the same processes as in the first embodiment, and descriptions thereof are omitted.

When the use of the OCR function is set to be prohibited (step S104; Yes), the controller 100 (character recognizer 1012) executes the character recognition processing on the image (step S108).

Then, the controller 100 (image outputter 1016) outputs a file including the character data (step S302). In this step, the controller 100 applies a protection setting to the character data of the output file (step S304).

The protection setting is a setting for adding an attribute related to security to the character data. Examples of the protection setting may include a setting such as "prohibit editing of character data", "prohibit copying of character data", or "prohibit searching of character data".

Figure 14:
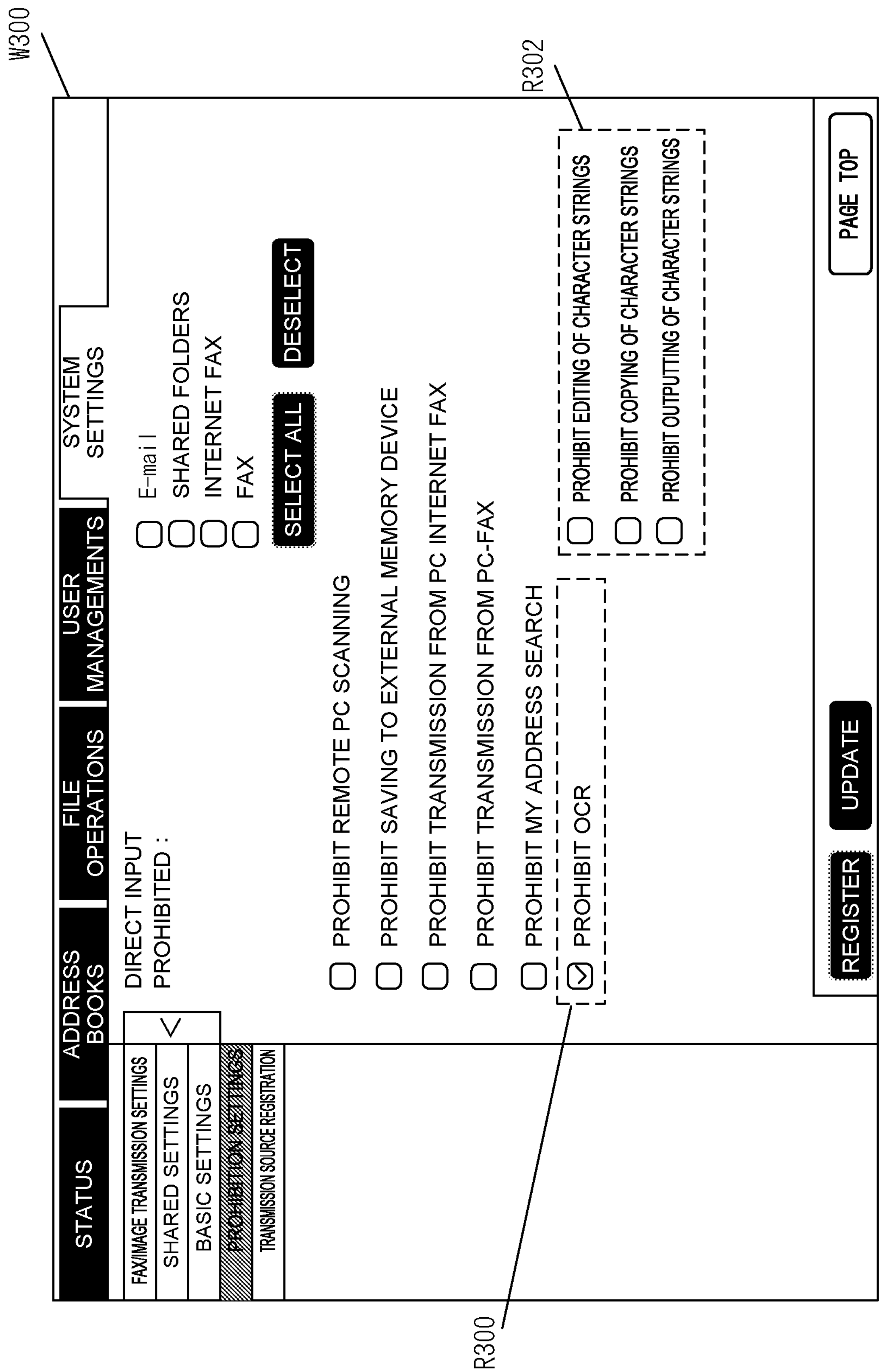
FIG. 14 is a diagram illustrating an example of a display screen (system setting screen) in the third embodiment.

In this step, the controller 100 may be able to broadly set the protection setting to the character data or may be able to individually set the protection setting on the system setting screen. For example, FIG. 14 is a diagram showing an example of the system setting screen. In a display screen W300 in FIG. 14, an area R300 is an area for setting about whether or not to permit the use of the OCR function. Here, when the use of the OCR function is prohibited (restricted) for the user in the area R300, the protection setting regarding the OCR function can be further performed in an area R302. For example, on the display screen W300, "prohibit editing of character strings" or "prohibit copying of character strings" can be set as the protection setting. Further, "prohibit outputting of character strings" may be set as the protection setting. Further, multiple settings may be set, or only one setting may be selected for the protection setting.

As described above, according to the present embodiment, when the use of the OCR function is prohibited for the user, the character data is subjected to the protection setting while being output, which makes it possible to make a setting which prevents the user from using the character data included in the output file without permission.

4. Fourth Embodiment

A fourth embodiment will be described. In the fourth embodiment, a format requiring the character recognition processing is selected as an output file by the user. Note that only points that are different from the first embodiment are described in the present embodiment, and descriptions are omitted for points that are the same in functional configuration and processing.

Figure 15:
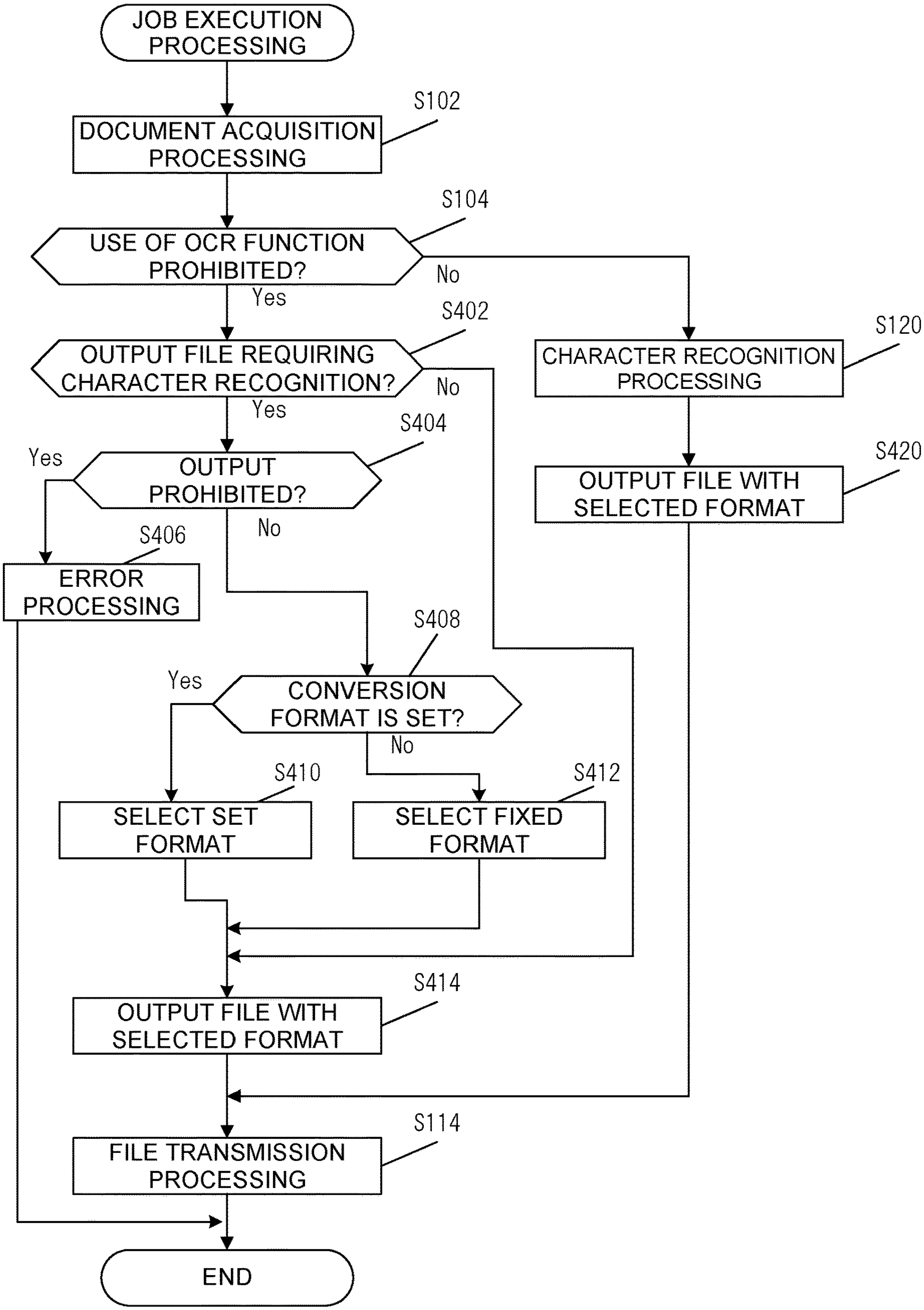
FIG. 15 is a flow diagram for explaining processing (job execution processing) in a fourth embodiment.

FIG. 15 is a flowchart modified from FIG. 9 of the first embodiment. The same reference signs are assigned to the same processes as in the first embodiment, and descriptions thereof are omitted.

When the use of the OCR function is set to be prohibited in the system settings (step S104; Yes), it is determined whether, as a format of the file to be output by the user, a format requiring the character recognition processing is selected (step S402).

The term "format requiring the character recognition processing" described herein refers to an output file that outputs a content based on the character data. Examples of such an output format include a format such as a text file consisting of the character data only or a document file (e.g., a DOCX file, etc.) used in word processing software or the like.

Since the output file with a format having a content based on the character data always includes the character data, the controller 100 cannot output the file without using the OCR function. Thus, when the user selects the output file with the format that requires the use of the OCR function (step S402; Yes), the controller 100 determines whether or not outputting the output file is prohibited (step S404). Information indicating that the output file is prohibited is stored, for example, in the system setting table 1120 as the system settings.

When the use of the OCR function is prohibited and the file output is prohibited, the controller 100 performs error processing (step S404; Yes to step S406). For example, the controller 100 displays an error message saying "unable to output file" on the screen and disables the selection of the format.

When the file output is not prohibited (step S404; No), the controller 100 determines whether a conversion destination format is set (step S408). For example, the conversion destination format is stored in the system settings (system setting table 1120). When the conversion destination format is set, the controller 100 selects the conversion destination format set in the system settings instead of the format selected by the user (step S408; Yes to step S410).

When the conversion destination format is not set, the controller 100 selects a preset fixed format (step S408; No to step S412). The fixed format may be a format preset by the image forming apparatus 10.

Then, the controller 100 (image outputter 1016) outputs the output file in the selected format (step S414).

Further, when the use of the OCR function is not prohibited (step S104; No), the image outputter 1016 outputs the output file with the format selected by the user using the result of the character recognition processing (step S420).

Note that, when the use of the OCR function is prohibited in the system settings in advance, a file requiring the character recognition processing may be made unselectable as an output file. In this case, the processes of the steps S402 to S412 may not be executed.

Figure 16:
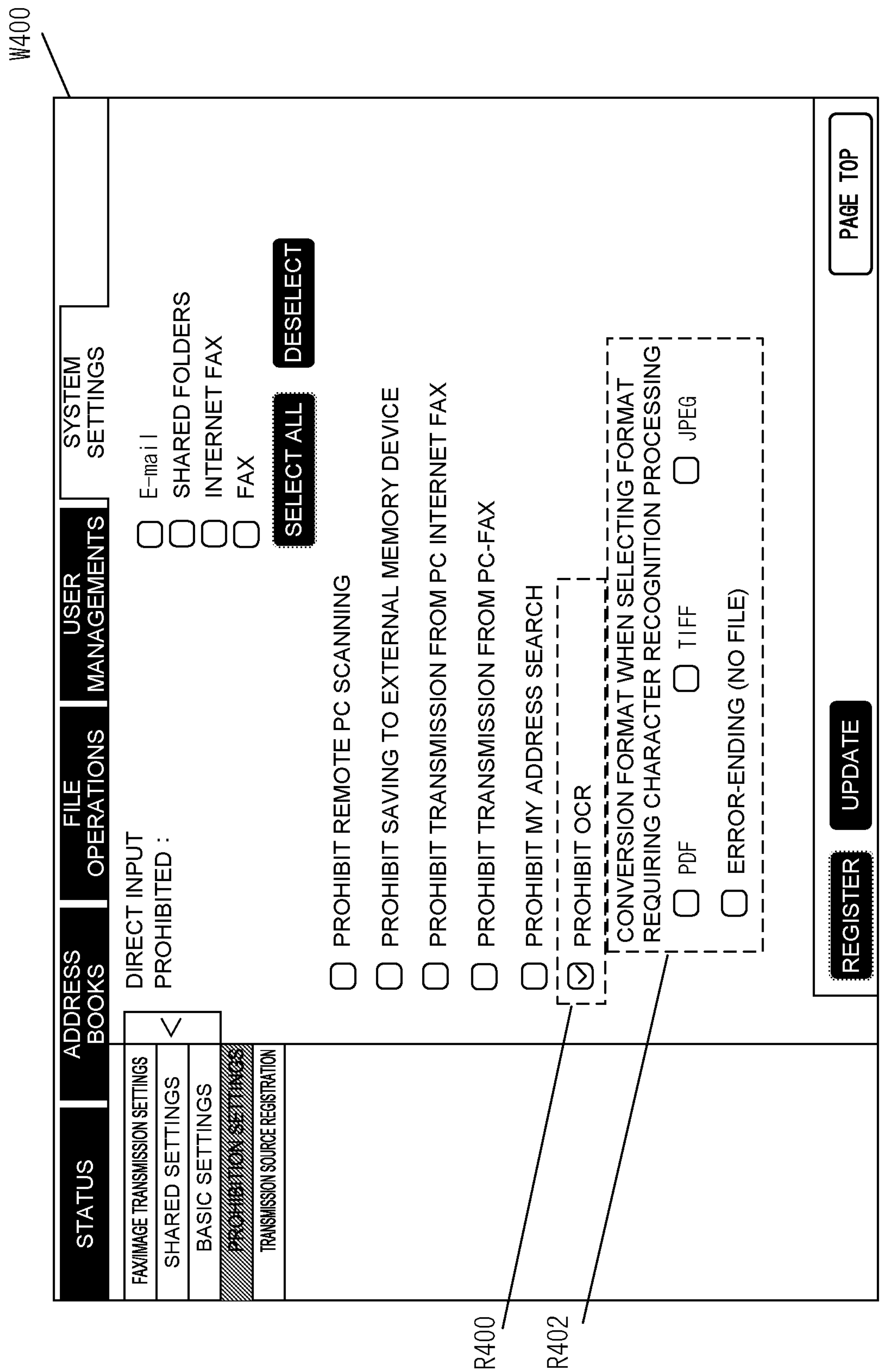
FIG. 16 is a diagram illustrating an example of a display screen (system setting screen) in the fourth embodiment.

FIG. 16 is a diagram showing an example of the system setting screen. In a display screen W400 of FIG. 16, an area R400 is an area for setting about whether or not to permit the use of the OCR function.

Further, an area R402 is an area for selecting an alternative conversion format when the format requiring the character recognition processing is selected For example, in the area R402, PDF, TIFF, or JPEG can be selected as the alternative conversion format.

Further, in the area R402, an item of error-ending may be selected. When the item of error-ending is selected, the controller 100 executes error processing and does not output a file (e.g., S404: Yes to S406 in FIG. 15).

Further, on the job setting screen, the controller 100 may display only formats that can be output. For example, the area R110 of the job setting screen shown in FIG. 11 displays a plurality of formats that can be output Of the formats displayed in the area R110, for example, only formats that can be output may be displayed. Alternatively, of the formats displayed in the area R110, those that cannot be selected may be displayed but grayed out.

As described above, in the present embodiment, even when the OCR function cannot be used, the user can select and output a file with the format requiring the character recognition processing. Note that when the OCR function cannot be used, the controller 100 may apply the protection setting to the output file. Further, the controller 100 may prevent the selection of an output file to which the protection setting cannot be applied. For example, when the OCR function cannot be used, the controller 100 may be configured not to allow the selection of a text file but allow a DOCX format to which the protection setting can be applied.

5. Fifth Embodiment

A fifth embodiment will be described. The fifth embodiment is for performing option processing. Note that only points that are different from the first embodiment are described in the present embodiment, and descriptions are omitted for points that are the same in functional configuration and processing.

Figure 17:
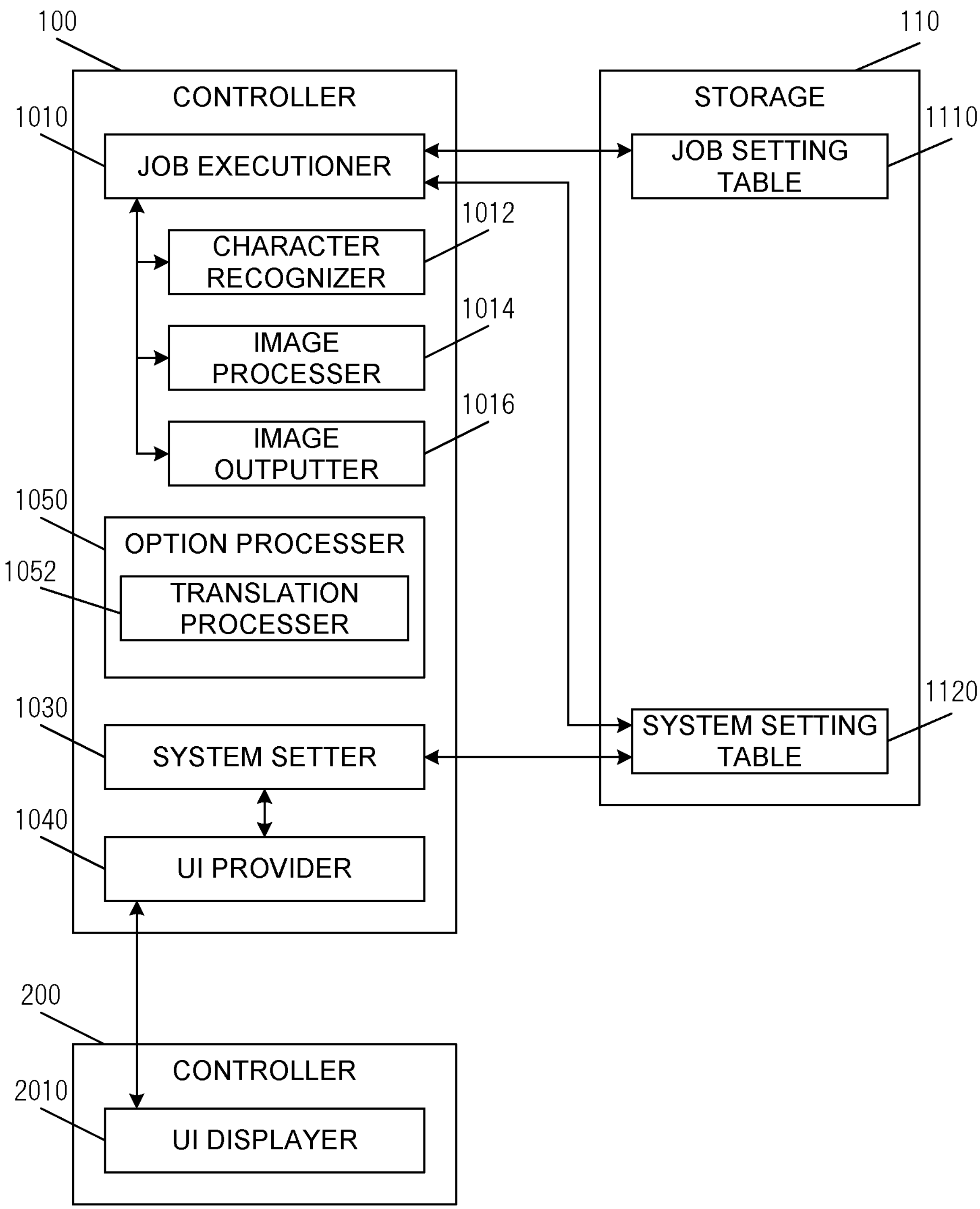
FIG. 17 is a diagram for explaining a software configuration in a fifth embodiment.

FIG. 17 is a diagram for explaining a software configuration of the fifth embodiment, modified from FIG. 4 of the first embodiment. Compared with the first embodiment, the present embodiment has a configuration in which an option processer 1050 is added.

The option processer 1050 provides the image forming apparatus 10 with an optional function. The option processer 1050 may be pre-installed in the image forming apparatus 10 or may be added later. For example, in the present embodiment, a translation function can be provided to the user by executing processing of a translation processer 1052 as an example of the option processer 1050.

The translation processer 1052 executes processing for translating characters (character strings) into a predetermined language. For example, the translation processer 1052 translates the character strings (character data) output by the character recognizer 1012 into another set language (e.g., from Japanese to English, from Japanese to Chinese, from English to Chinese, etc.) and outputs the result.

The translation processer 1052 may, for example, embed the translated character strings (character data) into the image output by the image outputter 1016. Further, the translation processer 1052 may output an output file in which an image of characters in a language included in the image output by the image outputter 1016 is converted to an image of characters in a translated language. Further, the translation processer 1052 may separately output a text file or a document file based on the translated character data.

Figure 18:
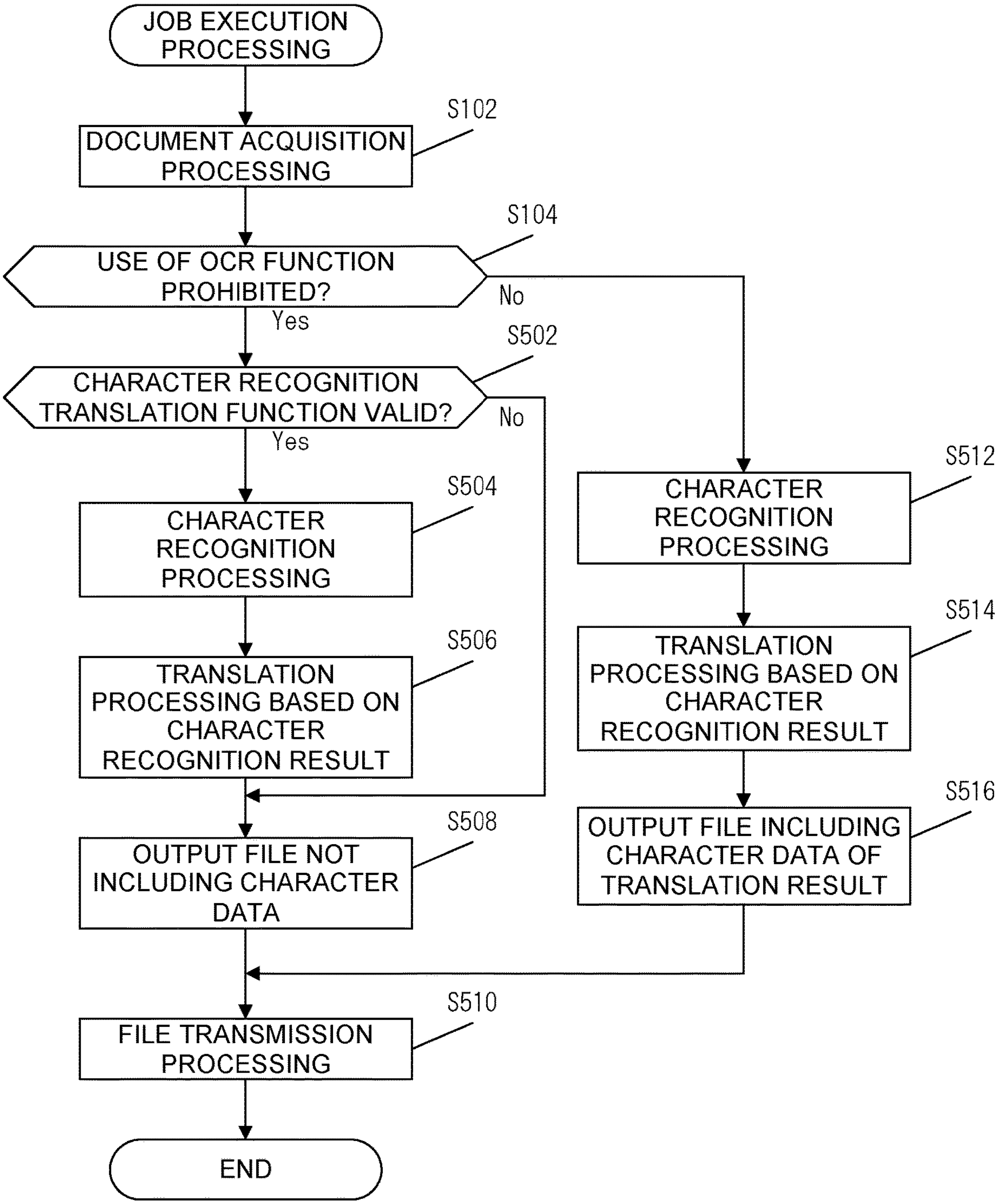
FIG. 18 is a flow diagram for explaining processing (job execution processing) in the fifth embodiment.

FIG. 18 is a flowchart modified from FIG. 9 of the first embodiment. The same reference signs are assigned to the same processes as in the first embodiment, and descriptions thereof are omitted.

When the use of the OCR function is not prohibited (step S104; No), the character recognizer 1012 executes the character recognition processing (step S512). The translation processer 1052 executes the translation processing based on the character data as the result of the character recognition (step S514). Then, the image outputter 1016 outputs an output file including the character data of the translation result (step S516). Note that the image outputter 1016 may also include the character data recognized by the character recognizer 1012 in addition to the translated character data.

Further, when the use of OCR recognition is prohibited (step S104; Yes), the controller 100 determines whether the translation function using the character recognition processing is valid (step S502). In this step, when the translation function using the character recognition processing is valid (step S502; Yes), the character recognizer 1012 executes the character recognition processing (step S504).

Then, the translation processer 1052 executes the translation processing based on the character data as the result of the character recognition processing (step S506).

The image outputter 1016 outputs an output file that does not include the character data (step S508). In this step, the following methods can be mentioned as a method for the image outputter 1016 to output a file that does not include the character data.

(1) The image outputter 1016 outputs a file without including any character data. For example, the image processer 1014 converts a pre-translation character image included in the image data to a post-translation character image, and the image outputter 1016 outputs the resulting image as an output file. Note that the image outputter 1016 may output an output file including the post-translation character image together with the pre-translation characters.

(2) The image outputter 1016 outputs a file including the post-translation character data to which the protection setting is applied. The image outputter 1016 outputs an output file in which the protection setting is applied to the post-translation character data such that the post-translation character data cannot be edited, or the character data cannot be copied.

(3) The image outputter 1016 separately outputs an output file based on the post-translation character data. For example, the image outputter 1016 outputs a post-translation text file or document file separately from an image-based output file. The image outputter 106 may apply the protection setting to the post-translation document file.

Note that setting a protection setting range allows the controller 100 to output a file with flexible formats. For example, the controller 100 may apply the protection setting only to the pre-translation character data or may apply the protection setting only to the post-translation character data.

6. Sixth Embodiment

A sixth embodiment will be described. In the sixth embodiment, the OCR function is permitted for a specific user even when the OCR function is prohibited in the system. Note that only points that are different from the first embodiment are described in the present embodiment, and descriptions are omitted for points that are the same in functional configuration and processing.

Figure 19:
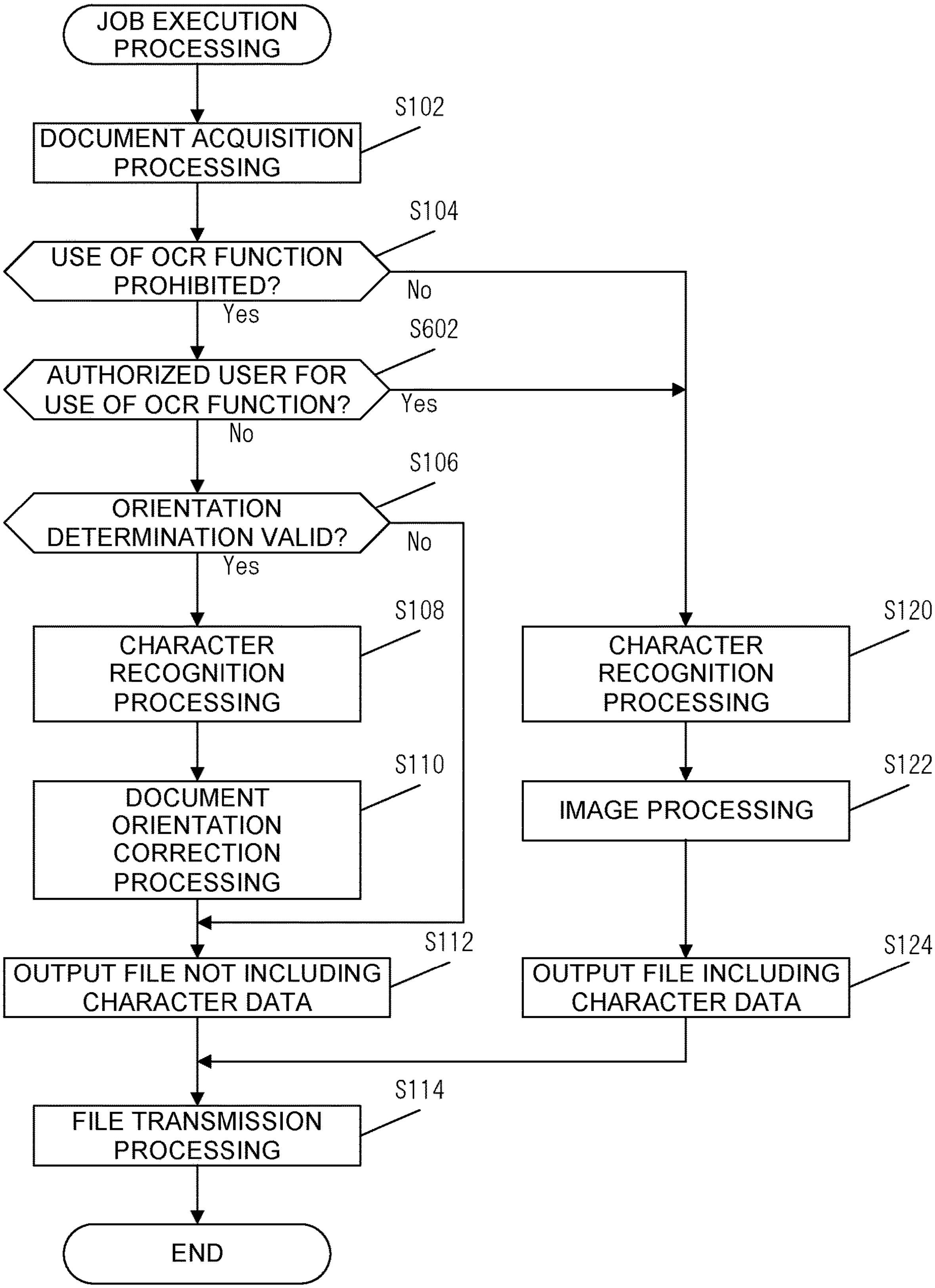
FIG. 19 is a flow diagram for explaining processing (job execution processing) in a sixth embodiment.

FIG. 19 is a flowchart modified from FIG. 9 of the first embodiment. The same reference signs are assigned to the same processes as in the first embodiment, and descriptions thereof are omitted.

Even when the OCR function is prohibited in the system settings (step S104; Yes), the controller 100 allows an authorized user to use the OCR function (step S602; Yes).

Here, the user who are permitted to use the OCR function may be a predetermined user such as an administrator. The permission may be set for each user or group (e.g., an administrator group). Further, the user who is permitted to use the OCR function may be, for example, an authenticated user. Further, the user may be permitted to use the OCR function by entering a password at the time of use.

7. Seventh Embodiment

A seventh embodiment will be described. The above-mentioned embodiments describe the OCR function as a specific function. That is, if the use of a specific function is prohibited on the system setting screen, the user cannot use the specific function, but the processing corresponding to the specific function can be executed in the apparatus.

In the present embodiment, a specific function applied to another function will be described. For example, a color output function will be described as a specific function. The color output function is a function for the image forming apparatus 10 to output a color printed matter or a color file.

For example, in the step S104 in FIG. 9, it is determined whether or not the color output function is prohibited instead of the OCR function. Then, when the color output function is prohibited, the controller 100 executes processing related to the color output.

For example, when processing using a color image (e.g., area segmentation processing, image sharpening processing) is valid, the controller 100 executes the processing based on the color image. Since the color output function is prohibited, the controller 100 outputs a file to be output as a monochrome file (a file expressed in gray scale, a file binarized in black and white). Further, for print processing, the controller 100 performs the print processing based on the monochrome image data.

Further, when the use of the color output function is not prohibited, the controller 100 executes processing using a color image based on the color image instead of the steps S120 to S122. Then, the controller 100 outputs a color image file. Further, for the print processing, the controller 100 performs the print processing based on the color image data.

8. Modifications

The present disclosure is not limited to the embodiments described above, and various modifications may be made.

That is, the technical scope of the present disclosure also includes embodiments obtained by combining technical measures that are modified as appropriate without departing from the gist of the present disclosure.

Further, in the above-mentioned embodiments, each embodiment is described separately for convenience of explanation. However, they can be executed in combination within a possible range. Further, the applicant intends to acquire rights to any of the technologies described in the specification through amendments, divisional applications, or the like.

Further, the program that runs on each device in each embodiment is a program that controls the CPU and the like (a program that causes a computer to function) so as to achieve the functions of the above-mentioned embodiments. The information handled by these devices is temporarily stored in a temporary storage device (e.g., a RAM) when being processed, then stored in various storage devices such as a ROM and an HDD, and read and modified/written by the CPU as necessary.

Here, a recording medium for storing the program may be any of a semiconductor medium (e.g., a ROM, a non-volatile memory card, etc.), an optical recording medium/magneto-optical recording medium (e.g., a Digital Versatile Disc (DVD), a CD, a BD (registered trademark), etc.), a magnetic recording medium (e.g., a magnetic tape, a flexible disc, etc.), and the like.

Further, when distributed to the market, the program can be distributed by storing it in a portable recording medium, transferred to a server computer connected via a network such as the internet, or the like. In this case, of course, the storage device in the server apparatus is also included in the present disclosure.

Further, the data described above may be stored in an external device instead of being stored in the apparatus and may be accessed as appropriate. For example, the data may be stored in a network attached storage (NAS) or on the cloud.

Note that the scope of the present disclosure is not limited to the configurations explicitly described in the specification but includes any combination of the technologies disclosed in the present specification. In the present disclosure, the configurations to be patented are described in the appended claims. However, it is not intended to exclude configurations from the technical scope on the grounds that the configurations are not described in the claims.

Further, in the above-mentioned specification, the descriptions with "if" and "when" are used for explaining examples and are not for limiting the disclosure to the described contents. Configurations other than the cases described with "if" and "when" are also disclosed to the extent that would be obvious to a person skilled in the art, and it is intended to acquire the right to such configurations.

Further, the order of processing and data flow described in the specification is not limited to the order in which they are described. For example, a configuration in which a part of processing is removed, or the order thereof is switched is also disclosed, and it is intended to acquire the right to such a configuration.

What is claimed is:

1. An image processing apparatus comprising:

an image reader that acquires an input image; and a controller, wherein:

the controller is configured to:

display a first setting screen including a setting button for setting, as valid or invalid, a first function of image processing for outputting an output file including a result of a character recognized by a character recognition processing, display a second setting screen including an item for prohibiting a use of the first function, on the first setting screen, when the first function is set as valid, recognize the character included in the input image, and output the output file including the result of the recognized character, on the second setting screen, when the use of the first function is set as prohibited indicate the setting button on the first setting screen as invalid, and when executing a second function of image processing on the input image using the result of the character recognition processing, recognize the character included in the input image, and execute the image processing based on the result of the character recognition processing, regardless of whether the first function is set as valid or invalid.

2. The image processing apparatus according to claim 1, wherein:

the controller is further configured to:

display, on the second setting screen, another item for setting the second function as valid, and when the second function is set as valid, recognize the character included in the input image, and execute the image processing based on the result of the character recognition processing regardless of whether the first function is set as valid or invalid.

3. The image processing apparatus according to claim 1, wherein the controller is configured to execute at least one of processes of an inclination correction of the input image and an orientation correction of the input image as the second function of the image processing.

4. The image processing apparatus according to claim 1, wherein:

the controller is further configured to output another output file in which the result of the character recognition processing is not included when the first function is set as invalid on the first setting screen or when the use of the first function is set as prohibited on the second setting screen.

5. The image processing apparatus according to claim 1, wherein:

the controller is configured to output the output file in which the result of the character recognition processing, to which a copying prohibition attribute is added, is included when the first function is set as invalid on the first setting screen or when the use of the first function is set as prohibited on the second setting screen.

6. The image processing apparatus according to claim 1, wherein:

on the second setting screen, when the use of the first function is set as prohibited, the controller makes the first function set as invalid on the first setting screen, the controller displays, on the second setting screen, another item for setting the second function as valid, and on the second setting screen, when the second function is set as valid, the controller recognizes the character included in the input image and executes the image processing based on the result of the character recognition processing.

7. A system comprising:

a storage device that stores an input image; and a controller, wherein:

the controller is configured to:

display a first setting screen including a setting button for setting, as valid or invalid, a first function of image processing for outputting an output file including a result of a character recognized by a character recognition processing, display a second setting screen including an item for prohibiting a use of the first function, on the first setting screen, when the first function is set as valid, recognize the character included in the input image, and output the output file including the result of the recognized character, on the second setting screen, when the use of the first function is set as prohibited indicate the setting button on the first setting screen as invalid, and when executing a second function of image processing on the input image using the result of the character recognition processing, recognize the character included in the input image, and execute the image processing based on the result of the character recognition processing, regardless of whether the first function is set as valid or invalid.

* * * * *